US008186706B2

(12) United States Patent
Dotsey

(10) Patent No.: US 8,186,706 B2
(45) Date of Patent: May 29, 2012

(54) ONE-HAND FOLD STROLLER FRAME

(75) Inventor: Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 341 days.

(21) Appl. No.: 12/352,384

(22) Filed: Jan. 12, 2009

(65) Prior Publication Data
US 2009/0278335 A1 Nov. 12, 2009

Related U.S. Application Data

(60) Provisional application No. 61/020,381, filed on Jan. 10, 2008.

(51) Int. Cl.
B62B 1/00 (2006.01)
(52) U.S. Cl. ...... 280/647; 280/650; 280/642; 280/47.38
(58) Field of Classification Search .................. 280/647, 280/649, 644, 650, 642, 639, 658, 47.38
See application file for complete search history.

(56) References Cited

U.S. PATENT DOCUMENTS

| 4,272,100 | A | * | 6/1981 | Kassai | 280/650 |
| 5,388,852 | A | | 2/1995 | Bigo et al. | |
| 5,669,623 | A | * | 9/1997 | Onishi | 280/642 |
| 5,695,212 | A | * | 12/1997 | Hinkston | 280/642 |
| 5,863,061 | A | | 1/1999 | Ziegler | |
| 6,375,213 | B1 | * | 4/2002 | Suzuki | 280/649 |
| 6,464,242 | B2 | * | 10/2002 | Suzuki | 280/642 |
| 6,533,310 | B2 | * | 3/2003 | O'Shea et al. | 280/644 |
| 6,752,413 | B2 | * | 6/2004 | Yamazaki et al. | 280/647 |
| 6,851,700 | B2 | * | 2/2005 | Yoshie et al. | 280/642 |
| 6,863,296 | B2 | * | 3/2005 | Yoshie et al. | 280/642 |
| 6,886,851 | B2 | * | 5/2005 | Chen | 280/642 |
| 7,077,420 | B1 | * | 7/2006 | Santoski | 280/642 |
| 7,114,743 | B2 | * | 10/2006 | Kassai et al. | 280/650 |
| 7,140,634 | B2 | * | 11/2006 | Kassai et al. | 280/642 |
| 7,246,813 | B2 | * | 7/2007 | Yamazaki et al. | 280/650 |

(Continued)

FOREIGN PATENT DOCUMENTS

DE 200 11 187 10/2000
(Continued)

OTHER PUBLICATIONS

International Search Report and Written Opinion issued in corresponding International Application No. PCT/US2009/030760 mailed Sep. 1, 2009.

(Continued)

Primary Examiner — Hau Phan
(74) Attorney, Agent, or Firm — Lempia Summerfield Katz LLC

(57) ABSTRACT

A foldable stroller frame has a frame structure with two laterally spaced apart frame sides. The frame structure is three dimensionally foldable from an in-use configuration to a folded configuration. A fold joint assembly is provided on a part of the frame structure and is configured to maintain the frame structure in the in-use configuration. An actuator is coupled to the frame structure and is capable of actuation with one hand of a user to release the fold joint assembly. The frame structure can then move from the in-use configuration to the folded configuration using only the one hand and the frame sides are laterally closer to one another in the folded configuration than in the in-use configuration.

20 Claims, 27 Drawing Sheets

U.S. PATENT DOCUMENTS

| | | | | |
|---|---|---|---|---|
| 7,367,580 B2 * | 5/2008 | Iwata et al. | .................... | 280/642 |
| 7,614,641 B2 * | 11/2009 | Hartenstine et al. | .......... | 280/642 |
| 7,780,183 B2 * | 8/2010 | Chen et al. | .................... | 280/647 |

FOREIGN PATENT DOCUMENTS

| EP | 0577 496 | 1/1994 |
|---|---|---|
| EP | 1 327 568 | 7/2003 |
| WO | WO 2007/045396 | 4/2007 |

OTHER PUBLICATIONS

Product Sheet for Peg Perego Pliko P3 Classico stroller; admitted prior art.

Product information for Greco Cleo Stroller obtained from www.elilecarseats.com; admitted prior art.

Instruction manual for Chicco Ct 1 stroller; admitted prior art.

Product Sheet for Peg Perego Pliko P3 Classico Stroller obtained from http://products.howstuffworks.com/ped-perego-pliko-p3-classico-stroller-review.htm, published Jun. 7, 2007.

Maura Keating, "Viva Italia: The Peg Perego Pliko P3 Classico," obtained from http://kidoinfo.com/ri/viva-italia-the-peg-perego-pliko-p3-classico/, published Apr. 30, 2008.

"The Greco Cleo Stroller: Luxury at a Lower Price Point," obtained from http://celebritybabies.people.com/2007/12/17/the-graco-cleo/, published Dec. 17, 2007.

Product information for Chicco CT 0.1 Stroller obtained from www.britbaby.com, published 2006.

Product Information for Chicco CT 0.1 Stroller obtained from www.babygenie.com, published Feb. 10, 2008.

Instruction manual for Chicco Ct 1 Stroller, published at least as early as Feb. 10, 2008.

\* cited by examiner

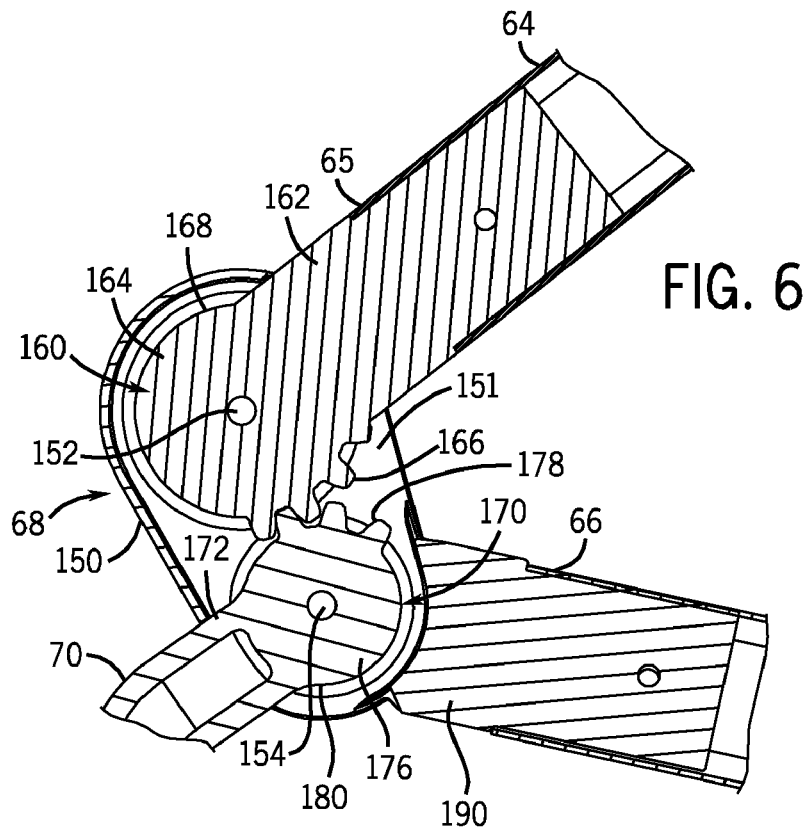
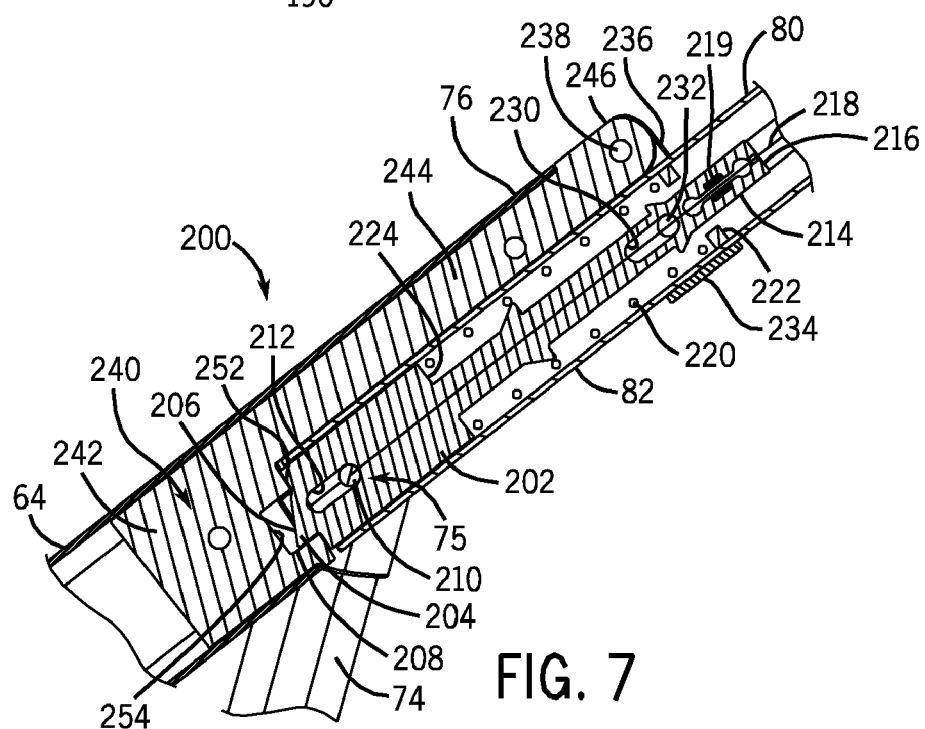

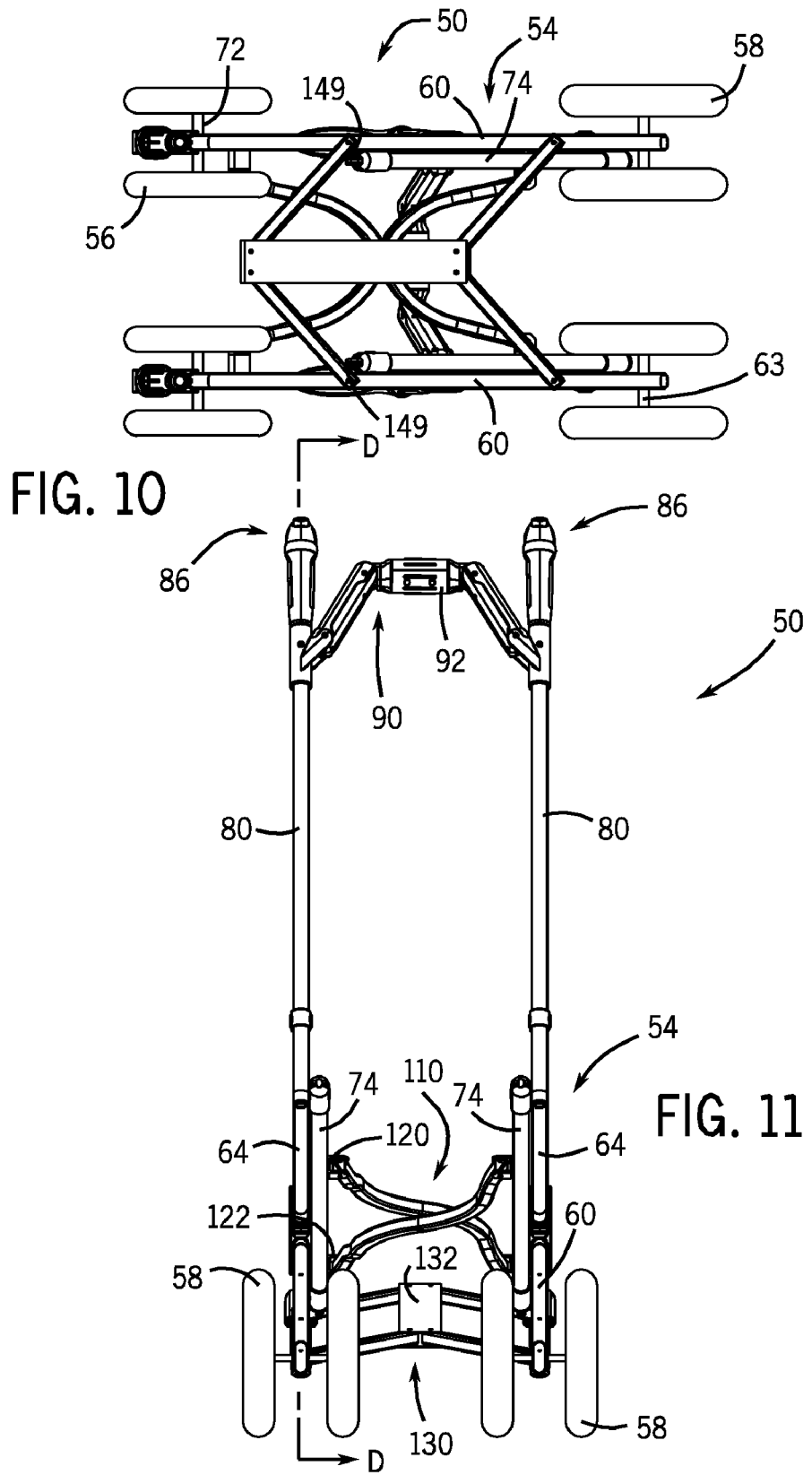

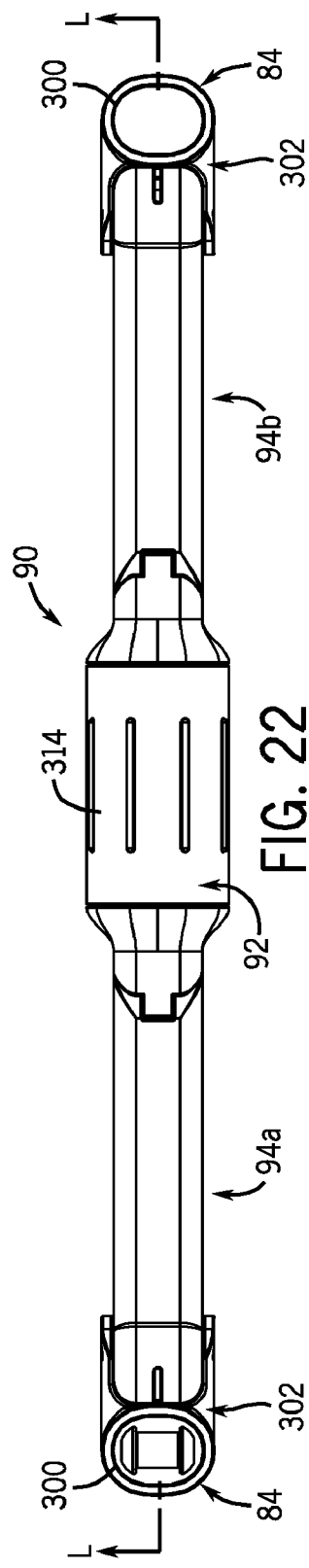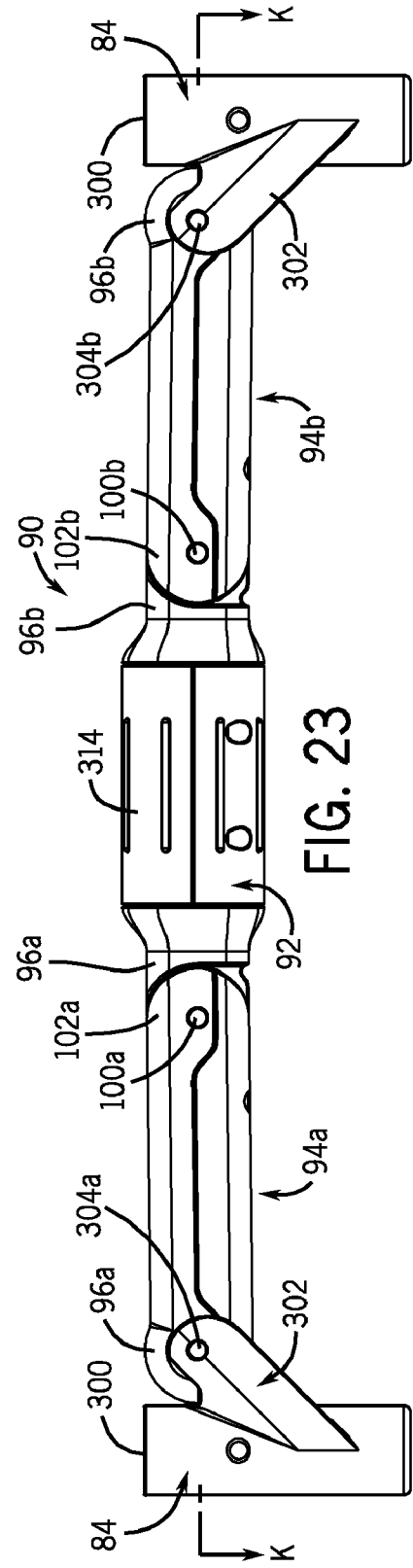

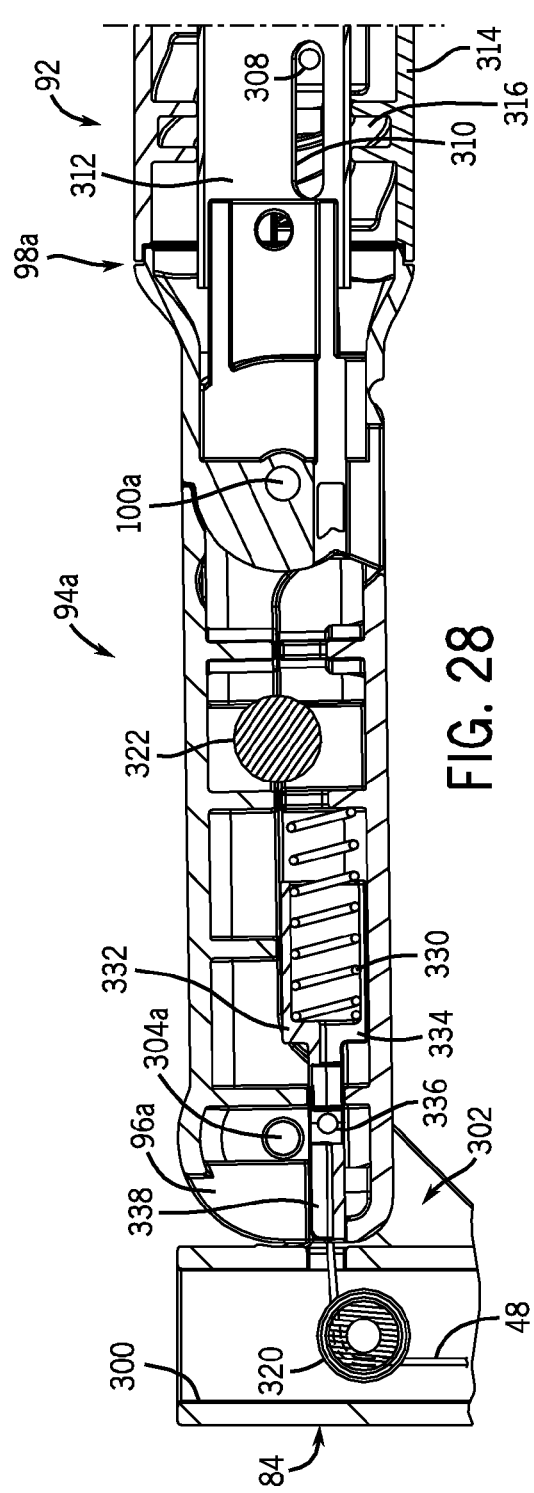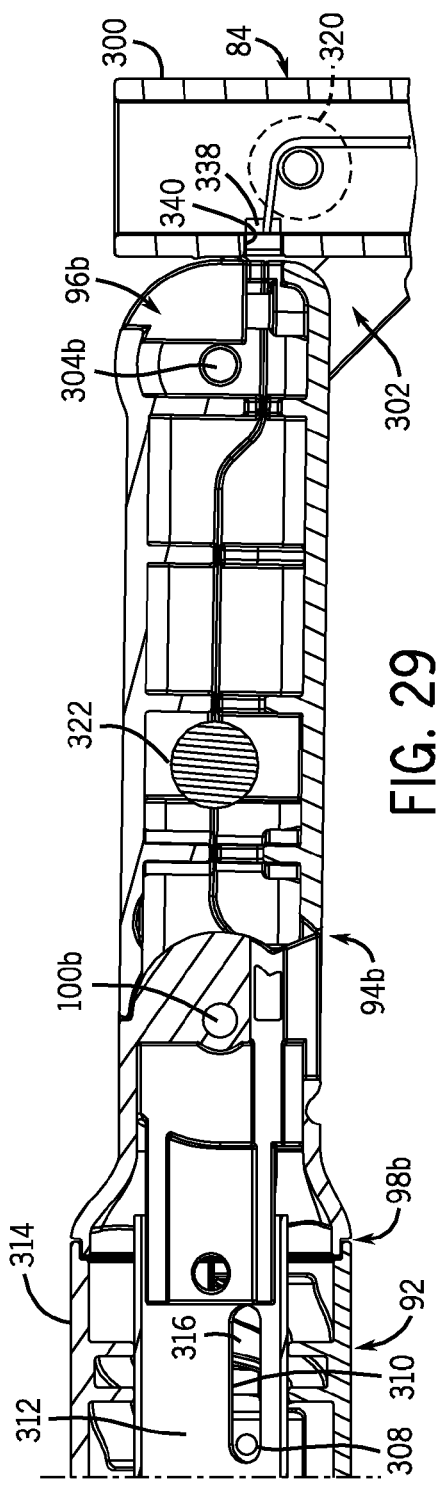

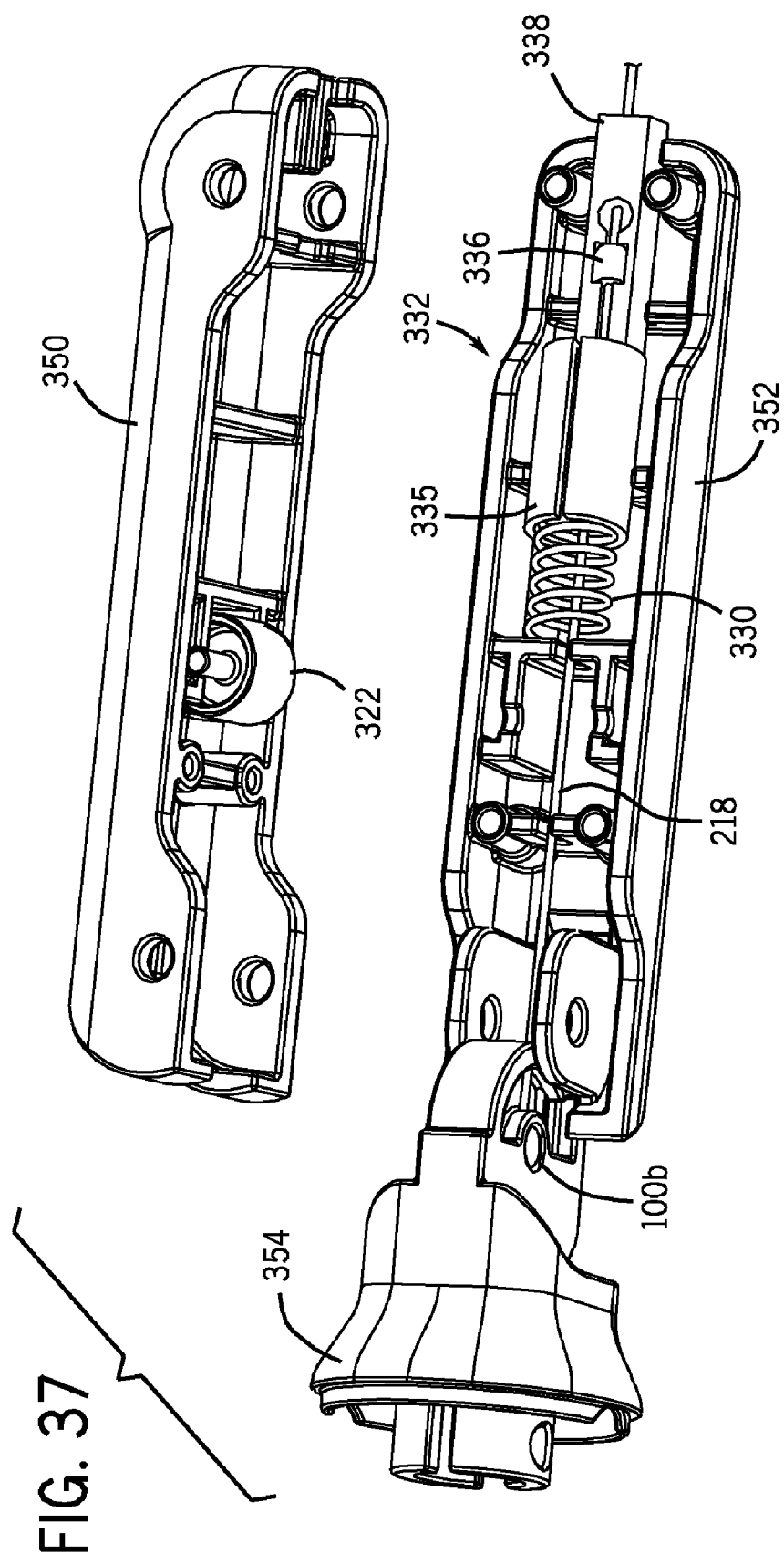

ONE-HAND FOLD STROLLER FRAME

RELATED APPLICATION DATA

This patent is related to and claims priority benefit of U.S. provisional application Ser. No. 61/020,381 entitled "One-Hand Fold Stroller Frame" and filed on Jan. 10, 2008, the entire contents of which are hereby incorporated herein by reference.

BACKGROUND OF THE INVENTION

1. Field of the Disclosure

The present disclosure is generally directed to collapsible strollers, and more particularly to a three-dimensionally collapsible stroller that can be folded by an operator using only one hand.

2. Description of Related Art

There are many foldable strollers on the market that fold in two-dimensions to a more compact configuration. These types of strollers do not fold laterally to a more compact width. Some of these known two dimensionally foldable strollers can be folded by an operator using only one hand from a fully set-up condition to the collapsed configuration. An example of a two-dimensionally foldable stroller of this type is produced under the name QUATTRO TOUR by Graco Children's Products Inc., also the assignee of the present patent.

There are also a number of strollers on the market that are foldable in three-dimensions meaning that the stroller can fold to a more compact configuration in length, height, and width. The folded width of these types of strollers is smaller than the stroller width in the set-up configuration. Examples of such three-dimensionally foldable strollers include the Peg Perego P3 stroller, the Chicco C1 stroller, and Graco's CLEO stroller.

These types of three-dimensionally foldable strollers use translating tubes to initiate folding, but require the use of two hands or a hand and a foot to complete folding of the stroller in length, width, and height. Thus, folding of this type of stroller can be more complex and difficult to accomplish than that of a two dimensional folding stroller. As a result, one hand fold, two-dimensional folding strollers are significantly more popular among consumers than three-dimensional folding strollers. This is true even though three-dimensional folding strollers are often more compact when folded and thus easier to store and transport. The ease of use of a one hand fold, two-dimensional folding stroller may thus be considered significant by consumers in comparison to a three-dimensionally folding stroller.

SUMMARY OF THE INVENTION

In one example of the invention, a foldable stroller frame is comprised of a frame structure with two laterally spaced apart frame sides. The frame structure is three dimensionally foldable from an in-use configuration to a folded configuration. A fold joint assembly is provided on a part of the frame structure and is configured to maintain the frame structure in the in-use configuration. An actuator is coupled to the frame structure and is capable of actuation with one hand of a user to release the fold joint assembly. The frame structure can then move from the in-use configuration to the folded configuration using only the one hand and the frame sides are laterally closer to one another in the folded configuration than in the in-use configuration.

In another example, the foldable stroller frame has a stroller handle with the actuator coupled to part of the stroller handle.

In another example, the foldable stroller frame has a pair of fold joint assemblies, one on each of the frame sides. A pair of push arms extends upward and rearward, one from each of the fold joint assemblies. A cross-bar extends between the push arms and the actuator is carried on the cross-bar. The push arms and the cross-bar can be pivoted forward using the one hand to reconfigure the frame structure to the folded configuration.

In another example, the foldable stroller frame has cross-bar between the frame sides that is reconfigurable from a substantially stiff condition in the in-use configuration to a loose, reconfigurable condition upon movement of the actuator to release the fold joint assembly.

In another example, a linkage assembly extends between the frame sides of the frame structure and is capable of movement between an on center or over center arrangement and a past center arrangement. The linkage assembly is retained in the on center or over center arrangement in the in-use configuration. A finger is carried on a part of the frame structure adjacent part of the linkage assembly and is configured to drive or kick the linkage assembly from the on center or over center arrangement to the past center arrangement as the frame structure is folded to permit folding of the linkage assembly.

In another example, each frame side of the frame structure has a bottom rail with a forward end and a rear end, a front leg with a lower end pivotally connected at a front leg pivot to the forward end of the bottom rail, a push arm with a lower end pivotally connected at a handle pivot to an upper end of the front leg, and a support strut pivotally connected at one end to the bottom rail at a strut pivot and pivotally connected at the opposite end to the lower end of the push arm at an upper strut pivot spaced from the handle pivot. The fold joint assembly releasably connects the lower end of the push arm to the upper end of the front leg.

In another example, the frame structure has a linkage assembly extending between bottom rails that is capable of movement between an on center or over center arrangement and a foldable past center arrangement. The linkage assembly retained in the on center or over center arrangement in the in-use configuration. A finger can be carried on the one end of a support strut adjacent the linkage assembly and can drive or kick the linkage assembly from the on center or over center arrangement to the foldable past center arrangement as the frame structure is folded.

In another example, the foldable stroller frame has a front wheel assembly mounted to each frame side. Each front wheel assembly is gear driven and pivotable from an in-use position to a folded position as the frame structure is folded.

In another example, the foldable stroller frame has a scissor cross-member extending between the frame sides. The cross-member has a pair of curvilinear arms coupled to one another at a center pivot.

In another example of the invention, a stroller has a frame assembly with a stroller handle and spaced apart left and right sides defining a stroller width. The frame assembly is foldable in at least height and width directions from an in-use configuration to a folded configuration. A fold latch is coupled to the stroller handle and is movable from a latched arrangement retaining the frame assembly in the in-use configuration to a released arrangement releasing the frame assembly and stroller handle for movement to the folded configuration. A fold actuator is coupled to the stroller handle and is actuable with only one hand to release the fold latch. The stroller handle then is movable with only the one hand to reconfigure the frame assembly from the in-use configuration to the folded configuration thereby reducing the width between the left and right sides.

In another example, the stroller has a pair of the fold latches and a pair of push arms extending upward and rearward, one from each of the fold latches.

In another example, a cross-bar extends between the push arms and the actuator is carried on the cross-bar. The push arms and the cross-bar can be pivoted forward using the one hand to reconfigure the frame structure to the folded configuration.

In another example, a cross-bar between the left and right sides is reconfigurable from a substantially stiff condition in the in-use configuration to a loose, reconfigurable condition upon movement of the actuator to release the fold latch.

In another example, a cable is routed from the fold latch through a handle push arm and a handle cross-bar to the actuator, whereby actuation of the fold actuator pulls on the cable to release the fold latch.

In another example, a cross-bar between the left and right sides has three sections pivotally connected to one another and the fold actuator is one of the sections and is rotatable about a lengthwise axis of the cross-bar.

In another example, a cross-bar between the left and right sides has at least two sections pivotally connected to one another and the fold actuator is on the cross-bar.

In another example, each of the left and right sides of the frame assembly has a fold latch and further has a front leg with an upper end and a lower end and a push arm with a lower end and an upper end. The push arm near its lower end is pivotally coupled near the upper end of the front leg.

In another example, the fold latch has a spring biased slider housed with the lower end of a push arm, a latch projection on an exposed end of the slider, and a latch receptacle on the upper end of a front leg of the frame assembly.

In another example, a cable interconnects the fold actuator with the fold latch. The cable passing through a push arm of the frame assembly.

In another example, a stroller frame structure has left and right sides and is three-dimensionally foldable in length, height, and side-to-side width directions from an in-use configuration to a folded configuration. The frame structure also has a fold joint assembly on each of the left and right sides of the frame structure. Each fold joint assembly in a latched condition is configured to retain the frame structure in the in-use configuration. The frame structure also has a front leg on each of the left and right sides of the frame structure. Each front leg has a lower end and an upper end. The frame structure also has a push arm on each of the left and right sides of the frame structure. Each push arm has an upper end and has a lower end pivotally coupled at the respective fold joint assembly to the respective front leg near the upper end of the front leg. A reconfigurable cross-bar extends between the push arms near the respective upper ends. An actuator on the cross-bar is actuable with only one hand to release the fold joint assemblies. The push arms are then pivotable forward with only the one hand to reconfigure the frame structure in the length, height, and width directions to the folded configuration.

In another example, a stroller frame structure has a bottom rail extending rearward from the lower end of a front leg on each frame side. A support strut is pivotally connected at one end to the bottom rail and pivotally connected at the opposite end to the lower end of a push arm on each frame side. A linkage assembly extends between the bottom rails and is capable of movement between an on center or over center arrangement and a foldable past center arrangement. The linkage assembly is retained in the on center or over center arrangement in the in-use configuration. A finger is carried on the one end of each support strut adjacent the linkage assembly. The fingers drive or kick the linkage assembly from the on center or over center arrangement to the foldable past center arrangement as the frame structure is folded.

BRIEF DESCRIPTION OF THE DRAWINGS

Objects, features, and advantages of the present invention will become apparent upon reading the following description in conjunction with the drawing figures, in which:

FIG. 6 shows an enlarged view of one example of a foldable front wheel joint taken from Circle B of the stroller frame in FIG. 5.

FIG. 7 shows an enlarged view of one example of a frame latch taken from Circle C of the stroller frame in FIG. 5.

FIG. 10 shows a bottom view of the partially folded stroller frame in FIG. 8.

FIG. 11 shows a rear view of the partially folded stroller frame in FIG. 8.

FIG. 22 shows a top plan view of one example of a collapsible cross-bar with a latch release actuator for the stroller frame in FIG. 1 and in a fully extended, in-use configuration.

FIG. 23 shows a rear plan view of the cross-bar in FIG. 22.

FIG. 28 shows an enlarged view of the left side of the cross-bar in FIG. 25.

FIG. 29 shows an enlarged view of the right side of the cross-bar in FIG. 25.

FIG. 37 shows a still further assembled view of the cross-bar components in FIG. 36.

DETAILED DESCRIPTION OF THE DISCLOSURE

Figure 1:
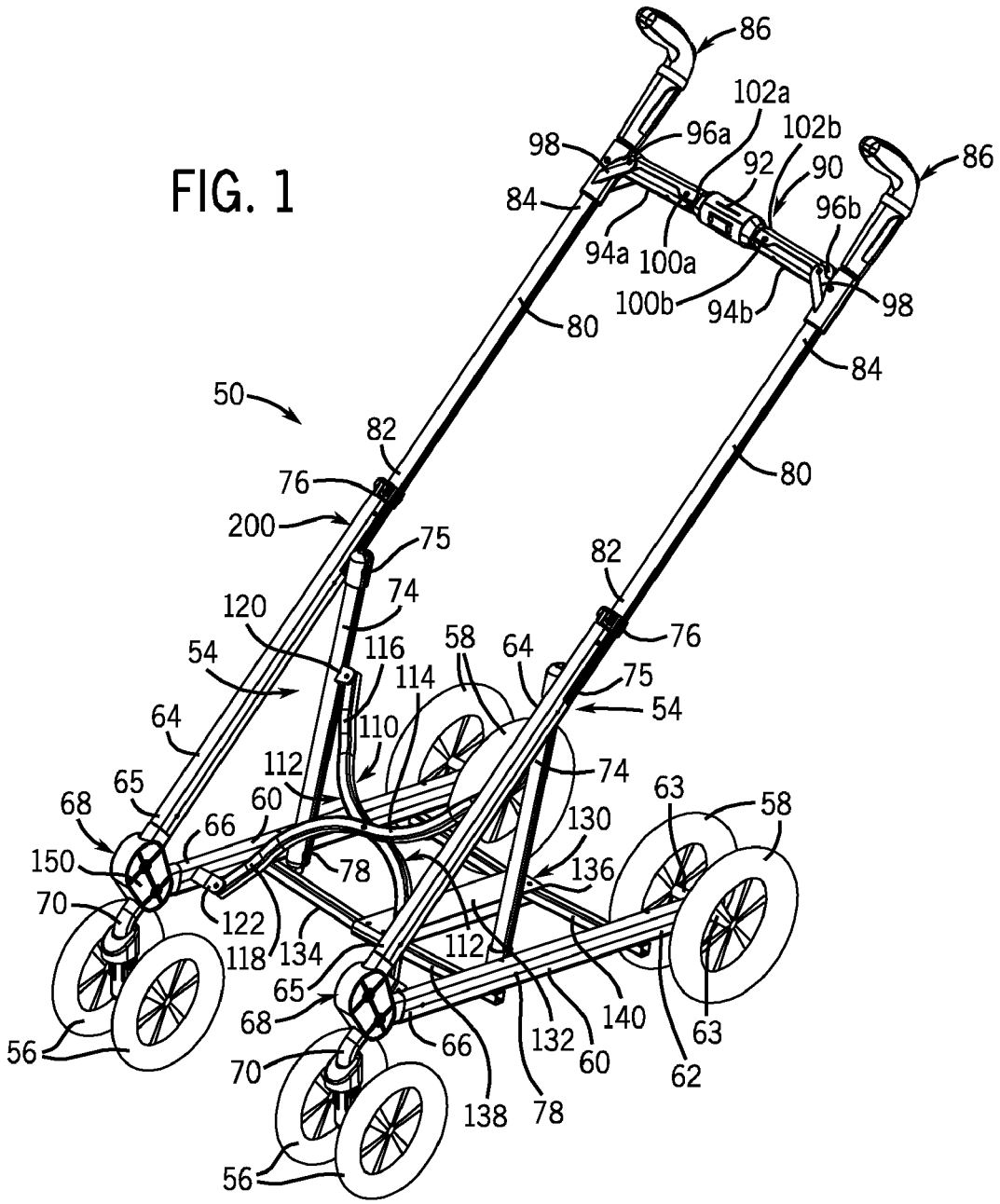
FIG. 1 shows a front perspective view of a three-dimensionally foldable stroller frame constructed in accordance with the teachings of the present invention and shown without the soft goods.
Figure 2:
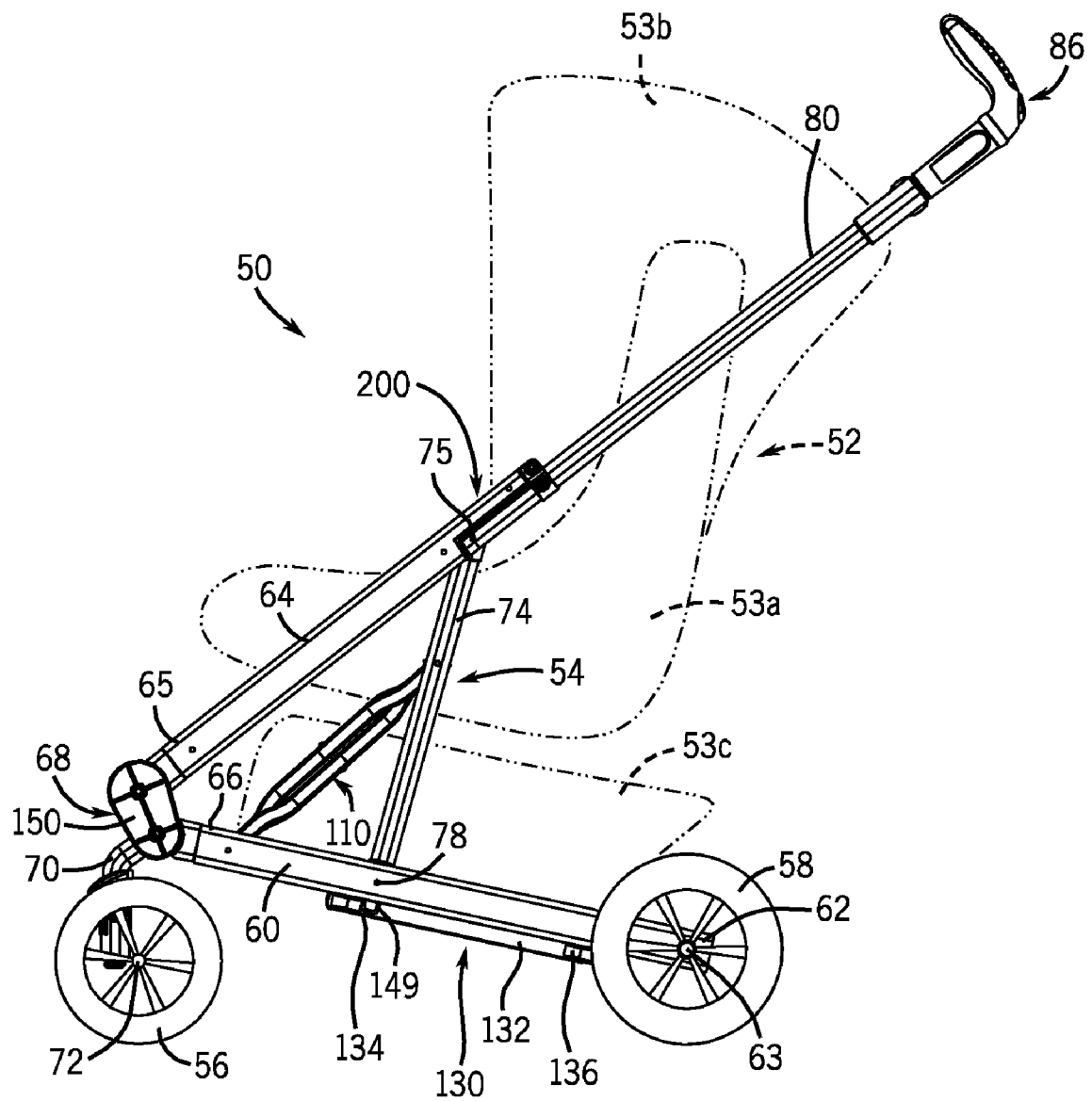
FIG. 2 shows a side view of the stroller frame in FIG. 1 and in an in-use or unfolded configuration.
Figure 3:
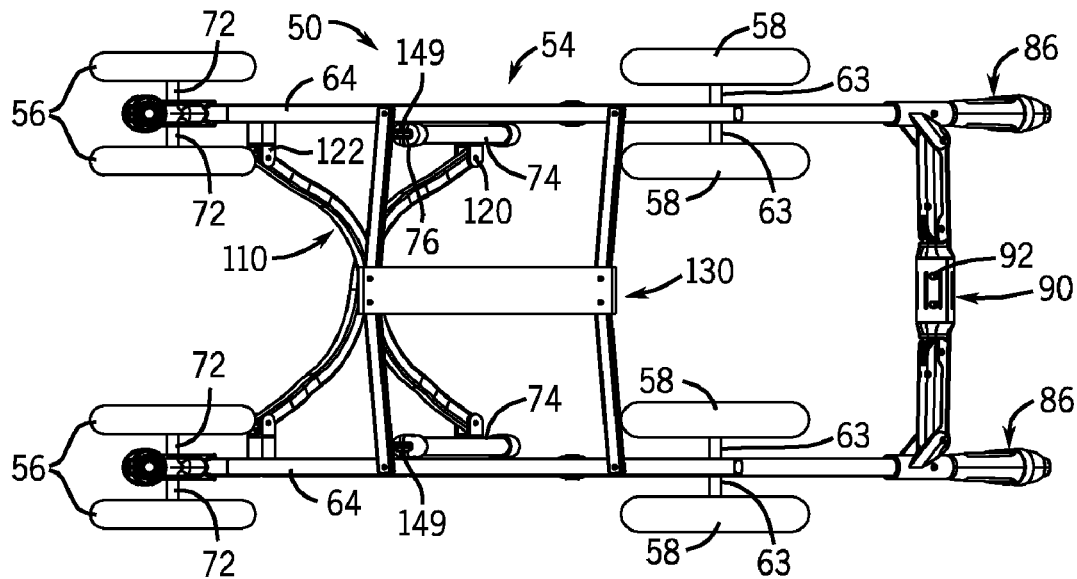
FIG. 3 shows a bottom view of the stroller frame in FIG. 1.
Figure 4:
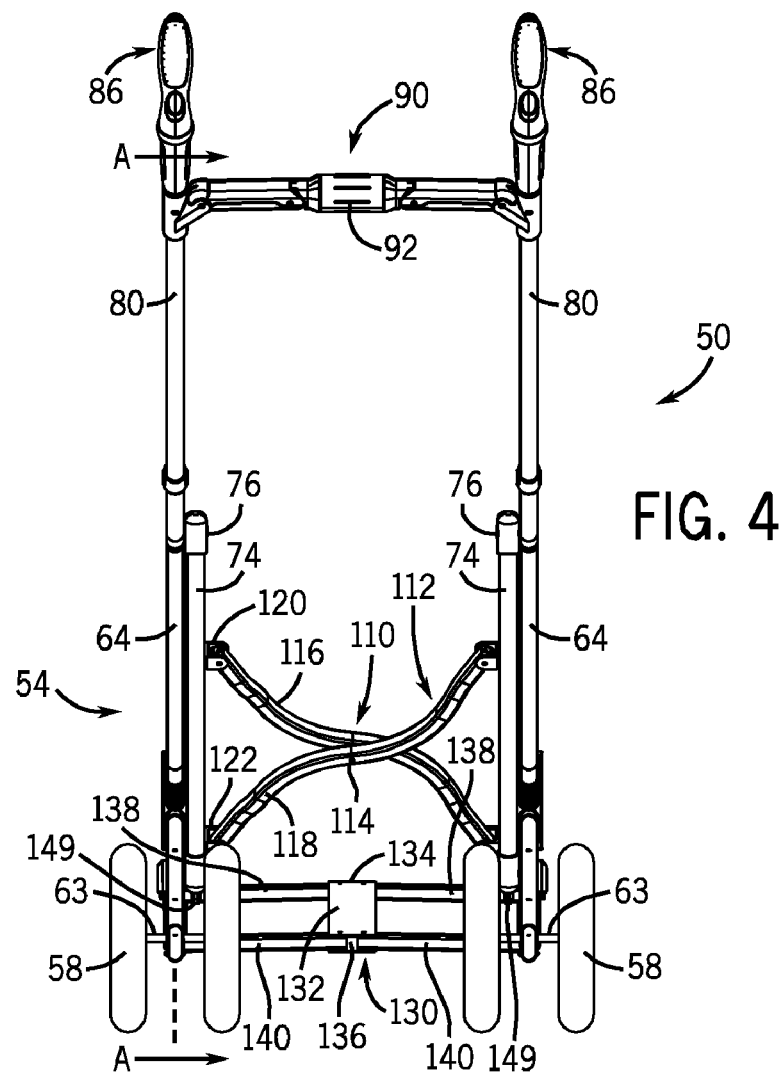
FIG. 4 shows a rear view of the stroller frame in FIG. 1.
Figure 5:
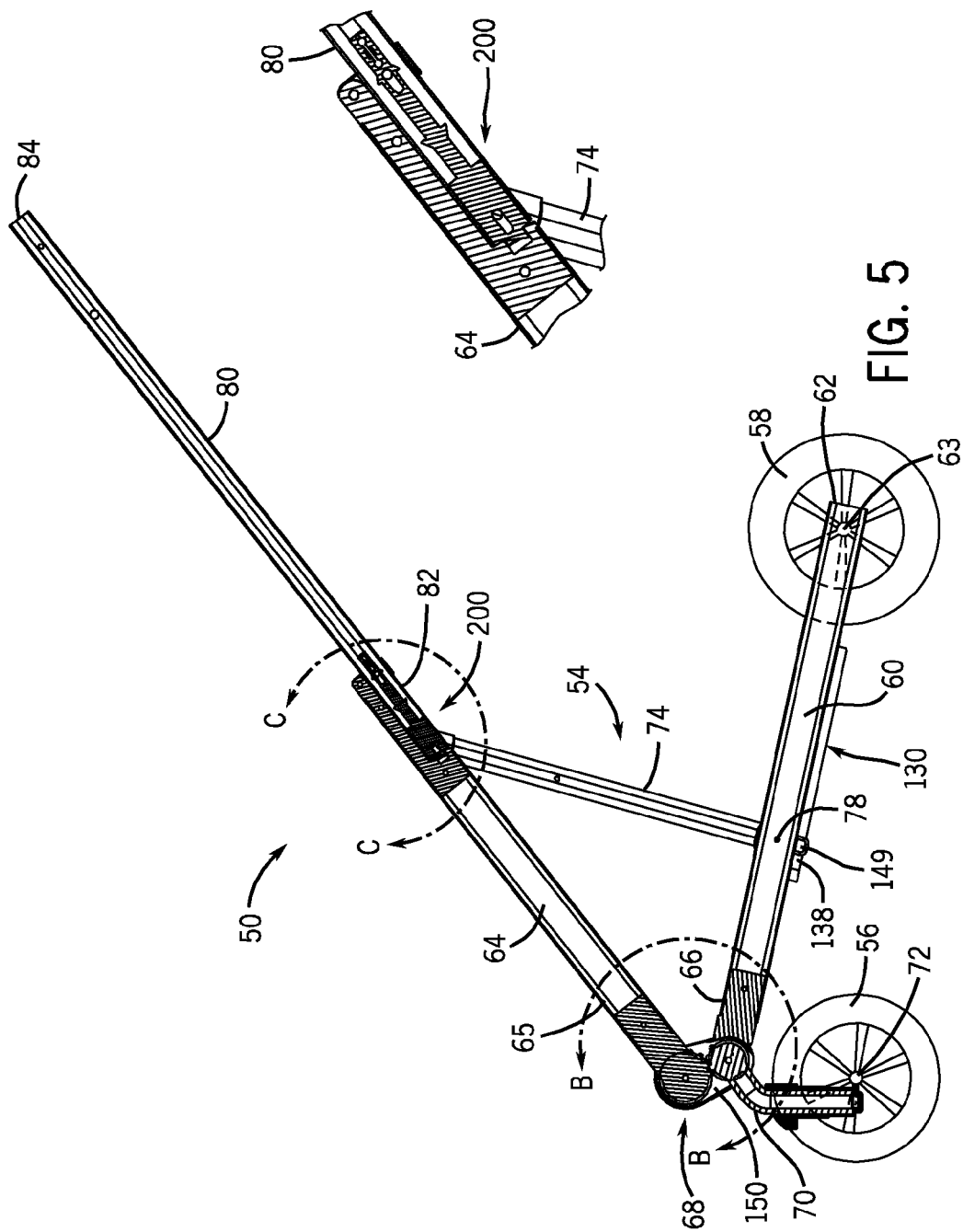
FIG. 5 shows a longitudinal cross-section taken along line A-A of the stroller frame in FIG. 4.
Figure 8:
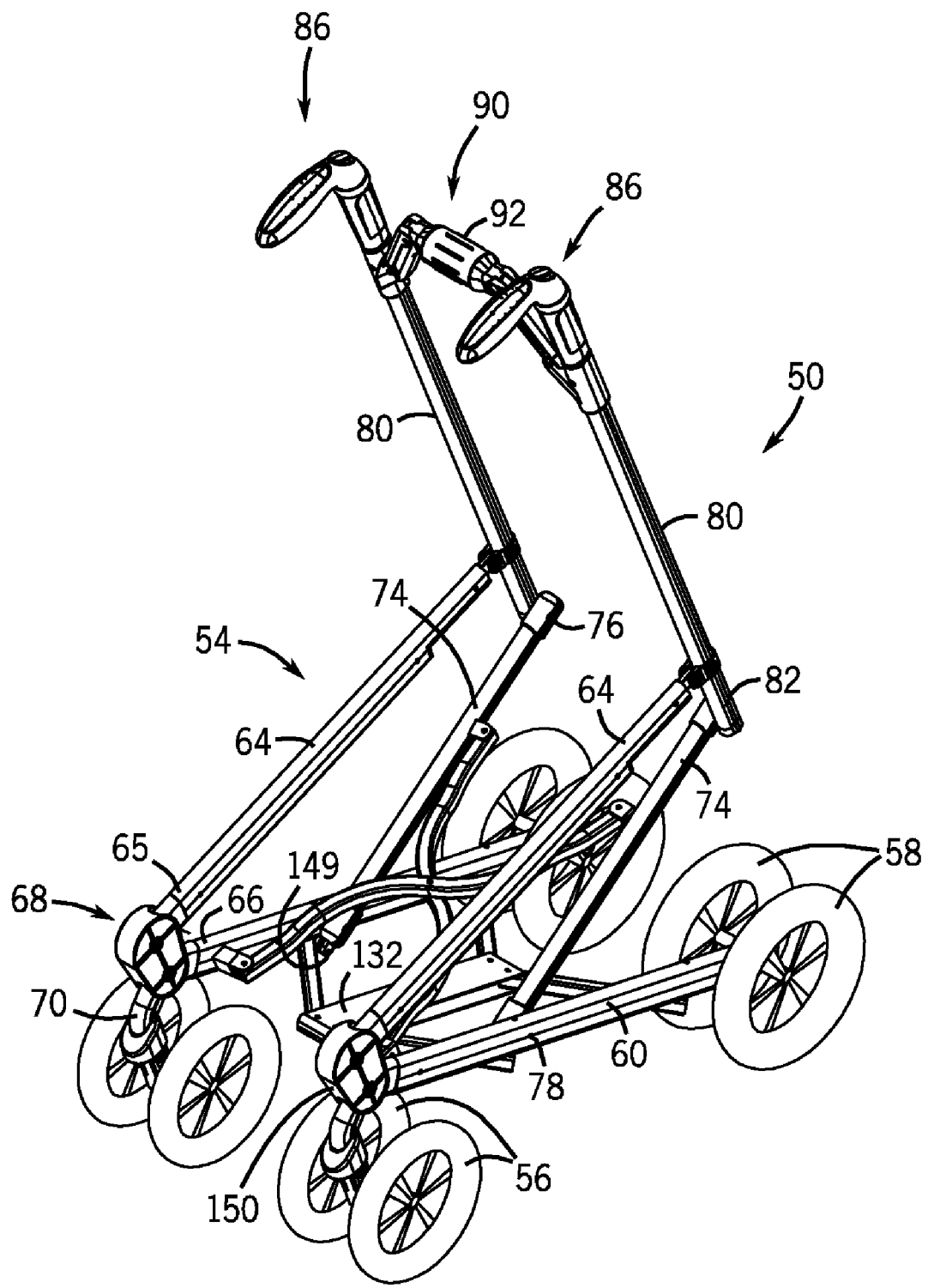
FIG. 8 shows a perspective view of the stroller frame in FIG. 1 and in a partially collapsed or folded configuration.
Figure 9:
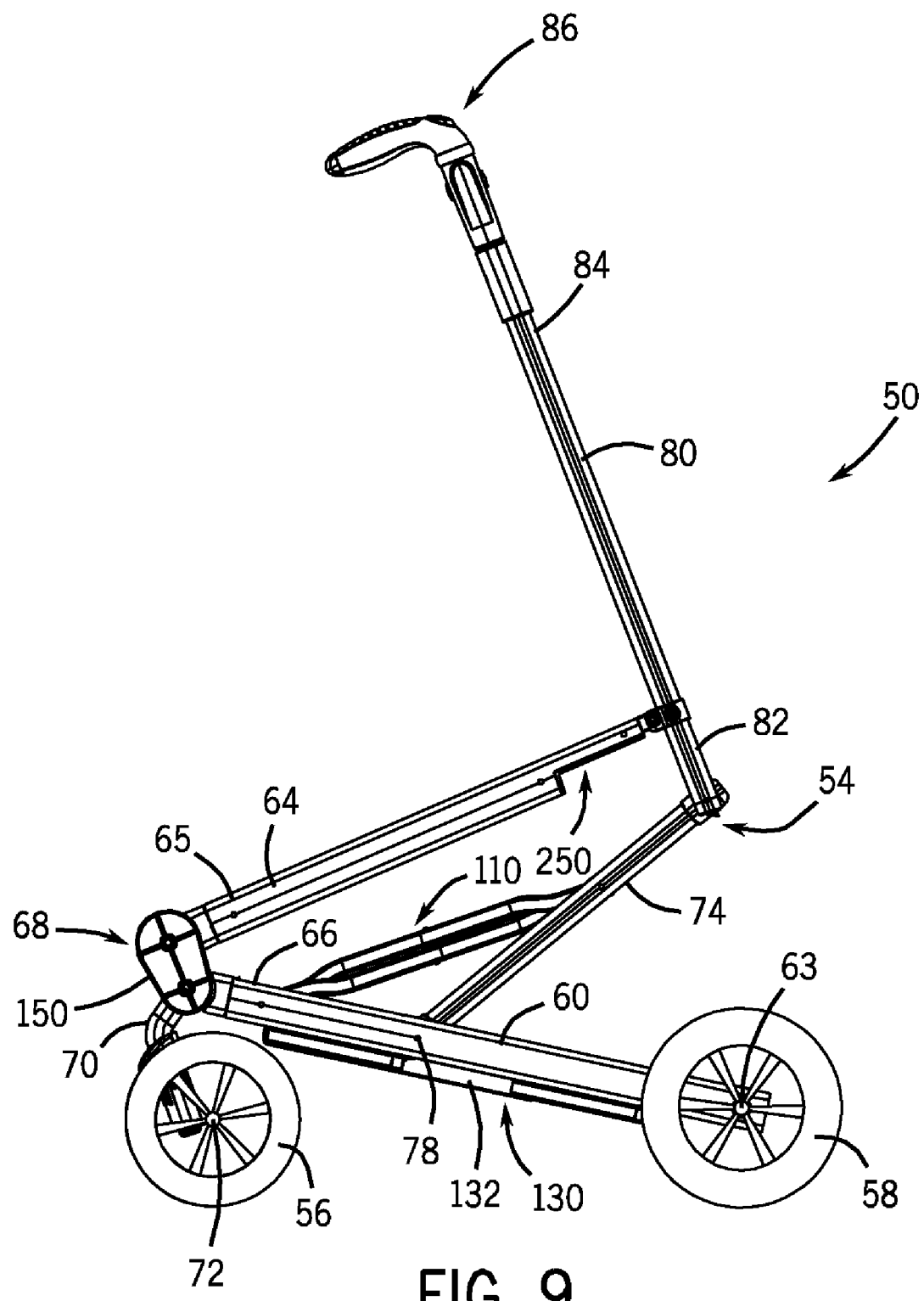
FIG. 9 shows a side view of the partially folded stroller frame in FIG. 8.
Figure 12:
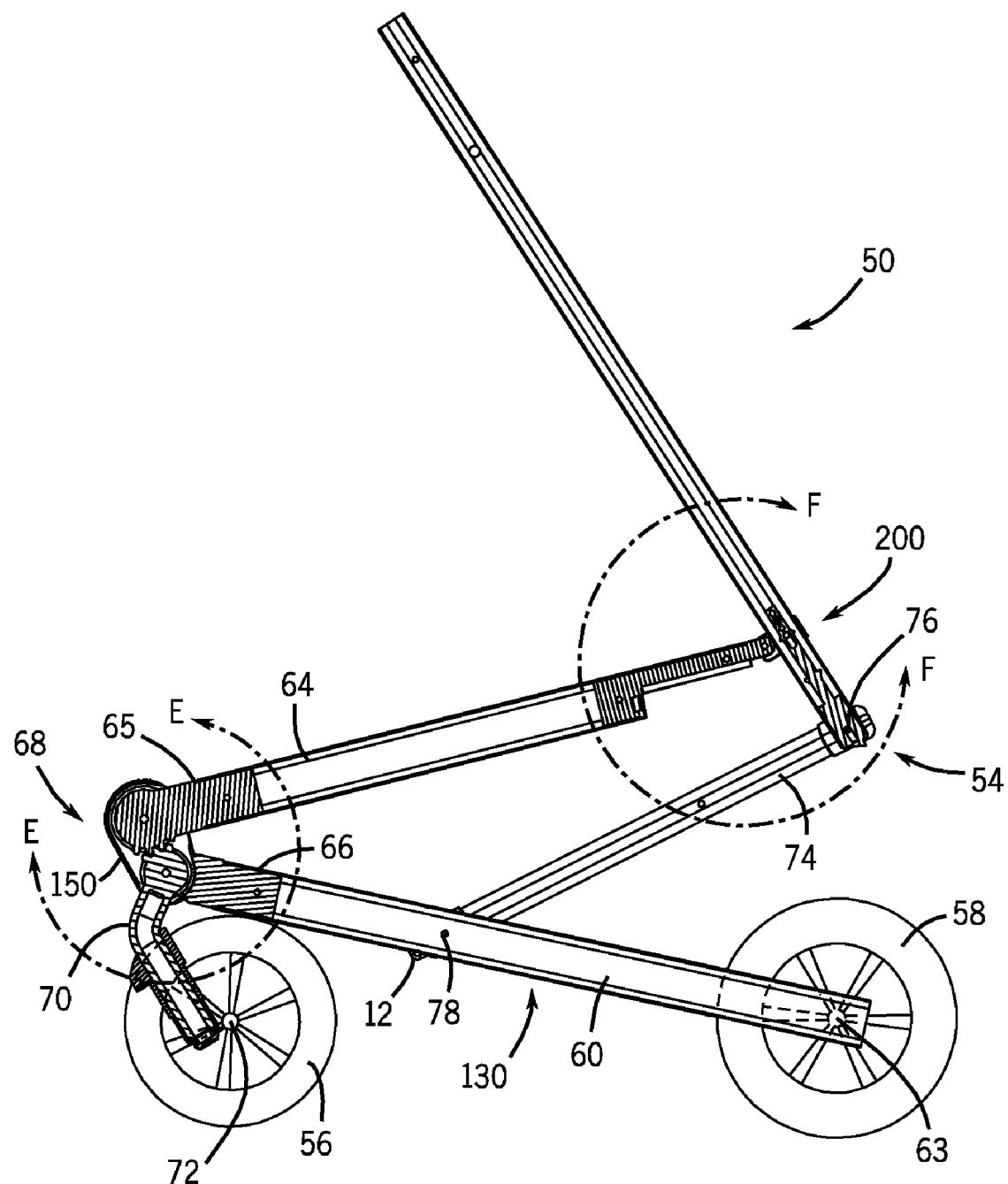
FIG. 12 shows a longitudinal cross-section taken along line D-D of the partially folded stroller frame in FIG. 11.

The disclosed stroller frame solves or improves upon one or more of the above-noted and other problems and disadvantages with known collapsible strollers. For example, the frame assembly disclosed herein can fold in three-dimensions and yet fold easily with little effort or bodily maneuvering. Also, the disclosed frame assembly includes a fold latch arrangement and a latch release actuator that permit the stroller to be easily folded from an in-use configuration to a compact folded configuration. The entire folding operation can be performed by an operator using only one hand. These and other objects, features, and advantages of the present invention will become apparent upon a review of the drawing figures and the detailed description presented herein.

Turning now to the drawings, a stroller 50 is depicted in FIGS. 1-4 and is constructed in accordance with the teachings of the present invention. The stroller 50 includes soft goods 52 (see FIG. 2) that are illustrated only in phantom view to depict a seat 53a and a seat orientation, a canopy 53b, and a basket 53c. As is known in the art, these soft goods 52, as well as the structural components supporting the seat 53a, the canopy 53b, and the basket 53c can vary considerably in configuration and construction and yet fall within the spirit and scope of the present invention. The soft goods 52 are not shown in any of the other figures herein, other than in FIG. 2, in order to permit clear depiction of the frame structure, folding motion, and overall configuration of the folding joints and components.

In the disclosed example, the stroller 50 has a frame assembly 54 that supports the soft goods 52 including the seat 53a, the canopy 53b, and the basket 53c. The stroller 50 also has a plurality of wheels that support the frame assembly 54 for rolling on a ground surface as is known in the art. In the example disclosed herein, the stroller 50 generically includes two pairs of front wheels 56 and two pairs of rear wheels 58 arranged at the two front and the two rear corners of the stroller. As will be evident to those having ordinary skill in the art, the stroller 50 alternatively can just as easily include two single front wheels and/or two single rear wheels instead of wheel pairs. The disclosed stroller 50 is not intended to be limited to a particular number or arrangement of wheels, to the four-cornered wheel arrangement, or to a particular wheel assembly construction.

FIGS. 1-4 show the stroller 50 in an in-use or unfolded configuration. In this configuration, the frame assembly 54 is ready for normal stroller use. FIGS. 1-7 illustrate features of the disclosed stroller 50, and particularly the frame assembly 54, in the in-use configuration. The frame assembly 54 generally has a front, a rear, and a pair of opposed left and right frame sides, taking the orientation of the seat 53a as a reference. Each frame side has a bottom rail 60 arranged generally horizontally and extending front to rear between the front wheels 56 and rear wheels 58 on the respective frame side. In the disclosed example, the bottom rails 60 are generally linear, but can alternatively be curved or non-linear within the spirit and scope of the present invention.

The rear wheels 58 are mounted directly to a rear end 62 of each bottom rail 60 in this example. A pair of axle stubs 63 can extend in opposite directions from the bottom rails of the stroller frame 54 with the rear wheels 58 mounted to the opposed ends of the axle stubs. Alternatively, the rear wheels 58 can be mounted in other suitable ways to the stroller 50 and yet fall within the spirit and scope of the present invention. Each frame side also includes a front leg 64 with a lower end 65 that is pivotally connected to a front end 66 of the respective bottom rail 60 at a front pivot joint 68. The front wheels 56 are provided as part of front wheel assemblies and are mounted on a wheel strut 70 that depends downward from the stroller frame 54 at each front corner. The struts 70 can depend from the front legs 64, the joints 68, or the bottom rails 60 within the spirit and scope of the present invention. One particular strut construction is described below in greater detail. The pair of wheels 56 on each side of the frame 54 can each be mounted to a short axle 72 carried on or coupled to a housing that is connected to the strut 70. Other optional wheel mounting and axle arrangements can also be utilized within the spirit and scope of the present invention. As is known in the art, the wheel struts 70 can also include an optional swivel function that permits the front wheels 56 to swivel around a vertical axis defined by the strut. This can render a stroller easier to turn and steer during use. A conventional swivel assembly can also be configured to allow the front wheels 56 to be optionally locked in a forward position to preventing swivel. These optional swivel features can also be employed on the stroller 50.

As shown in FIGS. 1-5, the front legs 64 of the stroller 50 extend upward and rearward from the front pivot joints 68 and are positioned at an acute angle relative to the generally horizontal bottom rails 60. Each side of the frame assembly 54 also includes an intermediate support strut 74 that is pivotally coupled at an upper strut pivot 75 to the respective frame side near an upper end 76 of the front leg 64. Each support strut 74 is also pivotally coupled at a lower strut pivot 78 positioned at an intermediate location along the respective bottom rail 60 between the front end 66 and rear end 62.

The disclosed frame assembly 54 also includes a pair of push arms or frame extensions 80 from the upper ends 76 of the front legs 64. Each push arm 80 has a lower end 82 that is pivotally coupled to the upper end 76 of the respective leg 64. The push arms 80 extend in an upward and rearward direction from the respective front legs and in the disclosed example are generally parallel with the front legs in the in-use configuration shown in FIG. 1. Each of the push arms 80 terminates at a distal or free end 84 behind the seat 53a of the stroller 50. An umbrella style handle 86 is connected to each of the push arm free ends 84. Umbrella style handles are generally known in the art and can vary in configuration, construction, and function and yet fall within the spirit and scope of the present invention. Certainly, other handles and gripping devices can alternatively be employed on the stroller 50. Each of the handles can be adjustable in rotational orientation, height (or lengthwise along the push arms), and angle, if desired.

The frame assembly can vary from the disclosed example and yet fall within the spirit and scope of the present invention. Other frame elements could be arranged so as to fold in three dimensions, though different from the frame assembly or frame structure shown and described herein.

A collapsible cross-bar 90 is interconnected to and extends between the push arms 80 near the upper ends 84. In the disclosed example, an actuator 92 is positioned centrally on the cross-bar 90. Both the cross-bar 90 and the actuator 92 are described in greater detail below. However, the cross-bar 90 can generally constructed so that it may be capable of retaining a substantially rigid form in the in-use configuration shown in FIGS. 1-4 to act as a brace or structural element of the frame assembly 54. Alternatively, the cross-bar may be held in the linear configuration in the in-use position merely by the frame geometry, if desired. The cross-bar 90 is also constructed to be capable of collapsing to permit the frame assembly to fold in a width-wise direction between the frame sides. The cross-bar 90 in this example has a pair of body sections 94a, 94b positioned on opposite ends of the actuator 92. Free outer ends 96a, 96b of the respective body sections 94a, 94b are connected at pivot couplings 98 to the corresponding push arms 80. The actuator 92 also has opposite ends 98a, 98b that are coupled at pivot joints 100a, 100b to the inner ends 102a, 102b of the body sections on the cross-bar 90. The three basic, pivotally connected components of the cross-bar 90 permit the bar to fold or collapse at the joints 100a, 100b and the couplings 98.

In an alternate example, the cross-bar can have two or at least two sections that are pivotally connected to one another so as to be capable of folding lengthwise. The cross-bar 90 need not have three sections as in the disclosed example. With two sections, the cross-bar could have a center pivot hub with a button actuator that slackens or releases the cross-bar and/or the stroller frame for folding.

As shown in FIGS. 1-4, the frame assembly 54 also has an X-shaped, scissor-like cross-member 110 that extends between and is pivotally coupled to each of the frame sides. In this example, the cross-member 110 has two arms 112 that intersect one another and that are pivotally connected to one another at a center pivot 114. The pivot 114 is positioned at about the respective mid-points of the arms 112. In this example, each arm 112 has a soft or gentle S-shape and has an upper end 116 on one frame side and a lower end 118 on the other frame side. The S-shape or curvilinear shape of the arms 112 places the arm ends 116 and 118 closer to and more parallel with the frame sides than if the arms were linear or straight elements. In one example, these curved arms 112 can provide clearance for the seat occupant's bottom when seated in the seat, resulting in a more comfortable seat structure. In alternate examples, the arms of the cross member 110 can be straight or linear, or of some other suitable shape.

Also in this example, the upper end 116 of each arm is connected to a respective one of the support struts 74. A top pivot coupling 120 is carried on about a mid-point of each strut 74 in this example to pivotally connect the respective arm end 116 to the frame side. A similar bottom pivot coupling 122 is carried on each of the bottom rails 60 to pivotally connect the respective lower arm end 118 to the frame sides. The bottom pivot couplings 122 are connected to the bottom rails 60 between the front ends 66 and the bottom strut pivot 78. In this example, the pivot couplings 120 and 122 are free rotation pivot joints. The X-shaped cross-member 110 provides structural stability to the frame and interconnects frame parts to help facilitate folding of the stroller frame 54. In the in-use configuration of FIGS. 1-4, the cross-member 110 is expanded with the upper ends 116 and lower ends 118 laterally spaced apart from one another.

Also as shown in FIGS. 1-4, the stroller frame 54 has a linkage assembly 130 that extends between and interconnects the bottom rails 60 in this example. The disclosed linkage assembly 130 has a central carriage link 132 positioned centrally between and oriented parallel with the bottom rails 60. The carriage link 132 has a forward end 134 and a rear end 136 and is suspended between the bottom rails by four link arms. The four links include two forward links 138 and two rearward links 140. The forward links 138 are pivotally coupled at outer link joints 142 to the frame bottom rails 60 and at inner link joints 144 to opposite sides of the forward end 134 of the carriage link 132. Similarly, the rearward links 140 are pivotally coupled at outer link joints 146 to the bottom rails 60 and at inner link joints 148 to the rear end 136 of the carriage link 132. In the in-use configuration as shown, the carriage link is generally perpendicular to all four links 138, 140, the forward links 138 are parallel to and axially aligned with one another, and the rearward links are parallel to and axially aligned with one another. The linkage assembly 130 is provided to add structural stability to the frame 54 by interconnecting the bottom rails to help facilitate folding of the frame. The linkage assembly can be extend between the frame sides, but between optionally different parts of the frame assembly other than the bottom rails, and yet function as intended.

As shown in FIGS. 1-4, fingers 149 project down from the bottom end of each of the support struts 74 below the lower pivot 78. Each finger sits directly behind a respective one of the forward links 138. In the unfolded or in-use configuration, the bottom linkage assembly 130 can rest in an at-center or slightly over-center condition. As is described below, the linkage assembly 130 moves from the in-use configuration in a forward direction during folding. The assembly 130 can be provided with hard stops internally to prevent the assembly from moving further rearward from the in-use configuration. If desired, the assembly 130 can also be provided with some form of a detent mechanism to assist in holding the assembly in the in-use configuration. As described in greater detail below, the fingers 149 will drive or kick the forward links 138, and thus the linkage assembly 130, forward past center to release the linkage assembly from the slightly over-center or on-center condition to permit the assembly to fold. In three-dimensionally collapsible prior art strollers, this action of releasing one of the cross-braces is performed manually by the user, either by hand or foot, and secondary or separate from the primary fold action. Depending on where such a linkage assembly 130 is located, if provided, the fingers can be positioned on a part of the frame structure that suitably moves or pivots during folding so as to drive or kick the linkage assembly to the past center condition to further facilitate folding of the linkage and frame assembly.

As shown in FIGS. 1-6, the front pivot joints 68 of the frame 54 pivotally couple the front ends 66 of the bottom rails 60 to the lower ends 65 of the front legs 64. In the disclosed example, the front wheel struts 70 are mechanically connected at the joints 68 for rotation between an extended in-use position and a retracted or folded position. Each joint 68 in this example includes a gear housing 150 covering a bent end 151 affixed to each of the bottom rails 60. The bent ends 151 extend upward and forward from the majority of the respective bottom rails 60. A drive gear center pivot 152 is located at the top of the bent end 151. The lower end 65 of the front leg 64 on each frame side can be pivotally connected to the bent end 151 at the drive gear pivot 152. Each bent end 151 defines a bottom gear pivot 154 positioned below and spaced from the drive gear center pivot 152. The bottom pivot 154 pivotally connects the front end 66 of the respective bottom rail 60 to the front wheel strut 70. The gear housing 150 can be optionally provided to cover the joint 68 on each frame side, if desired.

As best illustrated in FIG. 6, a drive gear 160 is carried on or affixed to the lower end 65 of each front leg 64. An elongate stem 162 of the drive gear 160 inserted into an opening in the lower end 65 of each front leg 64 in this example. Each drive gear 160 is a disk 164 coupled to the stem 162. A plurality of gear teeth 166 extends outward and downward from a portion of a perimeter surface 168 of the drive gear disk. The center of the disk 164 is the aforementioned drive gear center pivot 152 and the drive gear 160 rotates or moves via movement of the front leg 64 on each side of the stroller frame. A follower gear 170 has a stem 172 that is formed as an integral upper end extension of each wheel strut 70 in this example. The follower gear 170 also has a disk 176 that is coupled to the stem 172. A plurality of gear teeth 178 extend outward and upward from a perimeter surface 180 of the disk and engage the teeth 166 of the drive gear. The center of the disk 176 is co-mounted for rotation on the pivot axis of the bottom gear pivot 154 in this example.

In this example, the bent end 151 of the joint 68 has an extension 190 that is received and secured in the hollow free end 66 of each bottom rail 60. Thus, the joint 68 including the bent end 151 is fixed to the bottom rail and does not move relative to the rail. In an alternate example, the bent end could be provided as part of the front leg instead of the bottom rail, or as part of the front wheel assembly. Different arrangements of the front pivot joints 68 can be configured within the spirit and scope of the present invention.

Pivotal motion of the front legs 64 in this example will drive rotation of the respective wheel struts 70 as is described below in greater detail. In the disclosed example, the front legs 64 are hollow tubes and the wheel struts are molded components. As will be evident to those having ordinary skill in the art, the particular configuration and construction of the joint 68, as well as the components coupled at the joint, can vary from the above-described example and yet fall within the spirit and scope of the present invention.

As best shown in FIGS. 1-5 and 7, the stroller frame 54 on each frame side has a fold joint assembly or fold latch 200. Each fold joint assembly 200 in the disclosed example incorporates a frame latch arrangement. The latch arrangement can be latched to retain the stroller frame 54 in the in-use configuration of FIGS. 1-4 and can be released to permit collapsing the frame assembly to a folded configuration as described below. Each fold joint assembly 200 in this example is formed at the junction between the support strut upper pivot 75, the upper end 76 of the front leg 64, and the lower end 82 of the push arm 80. As shown in FIG. 7, the lower end 82 of each push arm 80 is hollow and has an end opening. A slider 202 is received in the open lower end 82 and has an exposed latch finger or projection 204 extending out from the end. The latch projection 204 has an angled profile defining a ramped surface 206 on the exposed face of the projection. In the disclosed example, the bottom facing side of the projection 204 forms a catch surface 208.

The upper strut pivot 75 on each frame side includes a pivot pin 210 that extends through the end of the support strut 74 and lower end 82 of the push arm 80. Thus, each of the support struts is pivotally coupled to lower ends of the respective push arms in this example. The slider 202 includes a slot 212 that passes laterally through the slider body and extends in a longitudinal direction along the slider. The pivot pin 210 passes through the slot 212 in the slider, thus retaining the slide within the push arm 80. The length of the slot 212 can define the travel limits of the slider and thus the latch projection 204 in this example. The opposite end 214 of the slider 202 is coupled to an end 216 of a cable 218. In one example, the cables 218 can be pull-only cables that are spring biased in one direction and that can be pulled in the opposite direction against the spring bias. Such cables are generally under tension and thus do not require a sheathing, though a sheath can be provided to protect and increase durability of the cable core. The form of the slider 202, the projection 204, and the cable attachment mechanism can vary within the spirit and scope of the present invention. The cable end 216 can include a slug 219 either in-molded as part of the slider 202 or connected via a shaped slot arrangement (not shown) in the opposite end 214 of the slider. In another example, the cables 218 can be push-pull cables with a sheath and an inner core cable that is slidable within and along the sheathing.

In the disclosed example, a spring 220 can be seated within the end 82 of the push arm 80. One end of the spring 220 can bear against a fixed stop 222 and an opposite end of the spring can bear against a bearing surface 224 on the slider 202. The spring 220 can be employed to bias the slider outward from the open end of the push arm 80. The outward travel of the projection 204 can be limited by the slot 212 as shown in FIG. 6. Alternatively, the cable 218 can incorporate a spring within the end 82 of the push arm 80 or at a remote end of the cable as is known in the art. A second slot 230 is formed passing laterally through the opposite end 214 of the slider 202 and is also oriented extending in a longitudinal direction along the slider. A pin 232 or fastener extends across the push arm 80 through the second slot 230 and is positioned spaced from the pivot pin 210. The second slot 230 and pin 232 can also define the slider travel limits instead of or in combination with the slot 212 and pivot pin 210, as desired.

A pivot collar 234 surrounds each push arm 80 and is secured in place by the pin 232. Linear sliding movement of the slider 202 within the push arm 80 is maintained by both slots 212 and 230 and the pins 210 and 232. Linear movement can also be assisted via the shape of at least part of the slider being formed to match the interior shape of the push arm. The pivot collar 234 has a pair of spaced apart extensions 236 that project upward from one side of the push arm 80 in this example. An upper leg pivot pin 238 is mounted to and extends between the collar extensions 236 via aligned openings in the extensions. A connector 240 is inserted into the hollow end opening in the upper end 76 of each of the front legs 64. Each connector 240 in this example has a body section 242 seated within the end 76 of the leg 64. An elongate leg link 244 extends from the body section 242 and outward from the end 76 of the leg. A distal end 246 of the leg link 244 is pivotally coupled to the upper leg pivot pin 238 and is captured between the collar extensions 236. The end of the leg link is rounded to permit the leg link to rotate adjacent the push arm and yet lie directly adjacent the push arm in this example. As shown in FIG. 6, each front leg 64 has a first size in cross section near the connector body section 242. The leg link 244 has a smaller size in cross section creating a docking notch or nesting space 250 next to the leg link.

A face 252 of the body section 242 is exposed and faces toward the end of the leg 64. A latch receptacle 254 is recessed into the face 252. As shown in FIG. 6, the lower end 82 of each push arm 80 has a length extending beyond the location of the collar 234 and the pivot pin 238 that is sized to fit within the docking notch or nesting space 250 formed by the connector 240. When the joint assembly 200 is in a latched configuration as shown in FIG. 6, the latch projection 204 is seated within the receptacle 254. The catch surface 208 on the projection bears against a parallel side surface 256 within the receptacle and retains the assembly in the latched position. The end 82 of the push arm 80 is sized to be able to swing free of the notch or space 250 when the catch is released as described below. The ramped surface 206 on the projection 204 is positioned and shaped to automatically allow the projection to pop back into the receptacle when the stroller is unfolded as is also described in detail below.

The actuator 92 on the cross-bar 90 can be actuated to pull the cables 218 on each frame side in manner described in detail below in order to release the latch projections 204 of the fold joint assemblies. Generally, the stroller frame 54 can be folded by a user while requiring only one hand to release the latch joint assemblies 200 and then to move the stroller frame to the folded configuration. First, the user need only manipulate the actuator 92 with one hand, which will release the cross-bar 90 from its stiff tensile condition to its loose or lax collapsible condition and also pull on both cables 218 simultaneously. Manipulation of the actuator 92 thus will simultaneously withdraw each latch projection 204 from their respective receptacles 254. The stroller frame 54 is then ready for folding.

The configuration and construction of the latch assembly or fold latch and the fold joint assembly can vary from the example shown and yet function as intended. The fold latch should retain the frame assembly in the in-use configuration until released. Once released, the fold latch should release the frame elements to allow them to fold to the folded configuration. The stroller frame structure disclosed herein utilized two fold joints and fold latches, one on each side of the frame. It is conceivable that the stroller may have only one latch assembly or fold latch and perhaps even one fold joint or joint assembly. The above discussed frame assembly and various components were shown and described with reference to the in-use configuration of the stroller frame 50.

Referring to FIGS. 8-14, the stroller frame 54 is shown in a partially collapsed or folded configuration. A four-bar linkage is defined on each frame side. The four bars on each frame side include: 1) the front leg 64 between the leg pivot pin 238 and the drive gear pivot 152; 2) the front end of the bottom rail 60, including the bent end 151 fixed to the bottom rail, between the strut pivot 78 and the drive gear center pivot 152; 3) the support strut 74 between the strut pivots 78 and 75; and 4) the lower end 82 of the push arm 80 between the collar 134 and the strut pivot 75. Once the fold joint assemblies 200 are released for folding, the user need only begin to move the actuator 92 upward and forward.

This motion causes the push arms 80 to begin to pivot or rotate forward relative to the support struts 74 about the pivot pins 210. This movement rotates the lower ends 82 of the push arms 80 out of their respective docking notches or spaces 250 and away from the legs 64. The leg links 244 and upper ends 76 of the front legs 64 will then rotate about the leg pivot pins 238 relative to the fixed collars 234. The forward push arm movement changes the geometry of the four links, which begins to drop the support struts 74 and the front legs 64 downward and rearward about the lower strut pivots 78 and the drive gear center pivots 152, respectively. The motion of the support struts 74 rotates the fingers 149 forward, which in turn push the forward links 138 of the bottom linkage assembly 130 forward past center to allow the linkage assembly to fold side-to-side.

The motion of the support struts 74 also moves the upper ends 116 of the cross-member 110 further away from the lower ends 118, which are pivotally fixed to the bottom rails 60. The cross-member 110 will thus begin to collapse laterally inward as it lengthens, which in turn draws the bottom rails 60 and the support struts 74 laterally toward and closer to one another. The lax or loose condition of the cross-bar 90 permits this lateral inward movement at the upper ends of the push arms 80. The lengthening and narrowing of the cross-member 110 caused by the downward and rearward movement of the legs 64 and struts 74 effectively applies a force through the bottom ends 118 of the cross-member to the bottom rails 60. This force pulls the bottom rails 60 inward toward one another, which further collapses the linkage assembly 130. The carriage link 132 is moved forward relative to the bottom rails 60 as the four links 138, 140 rotate about the respective outer link joints 142, 146 and inner link joints 144, 148. As shown, the links 138, 140 begin to pivot rearward and collapse inward toward the carriage link 132.

Figure 13:
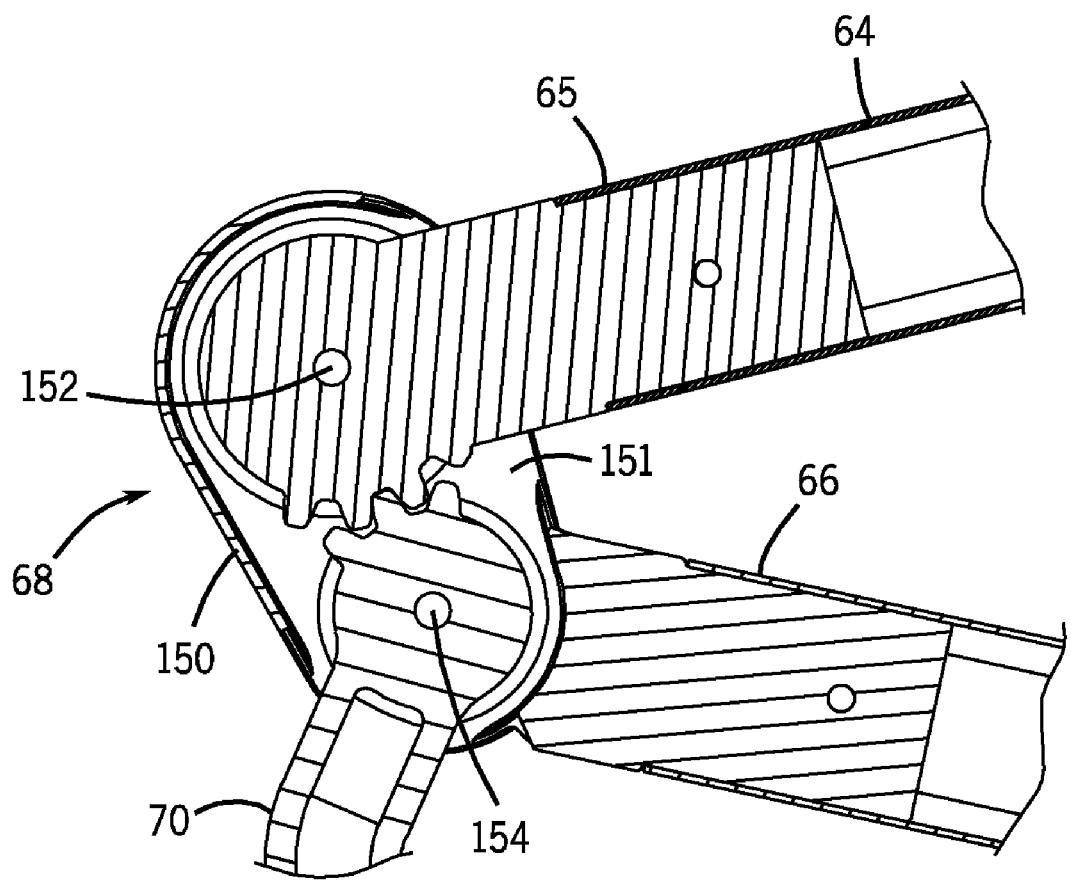
FIG. 13 shows an enlarged view of the front wheel joint taken from Circle E of the partially folded stroller frame in FIG. 12.
Figure 14:
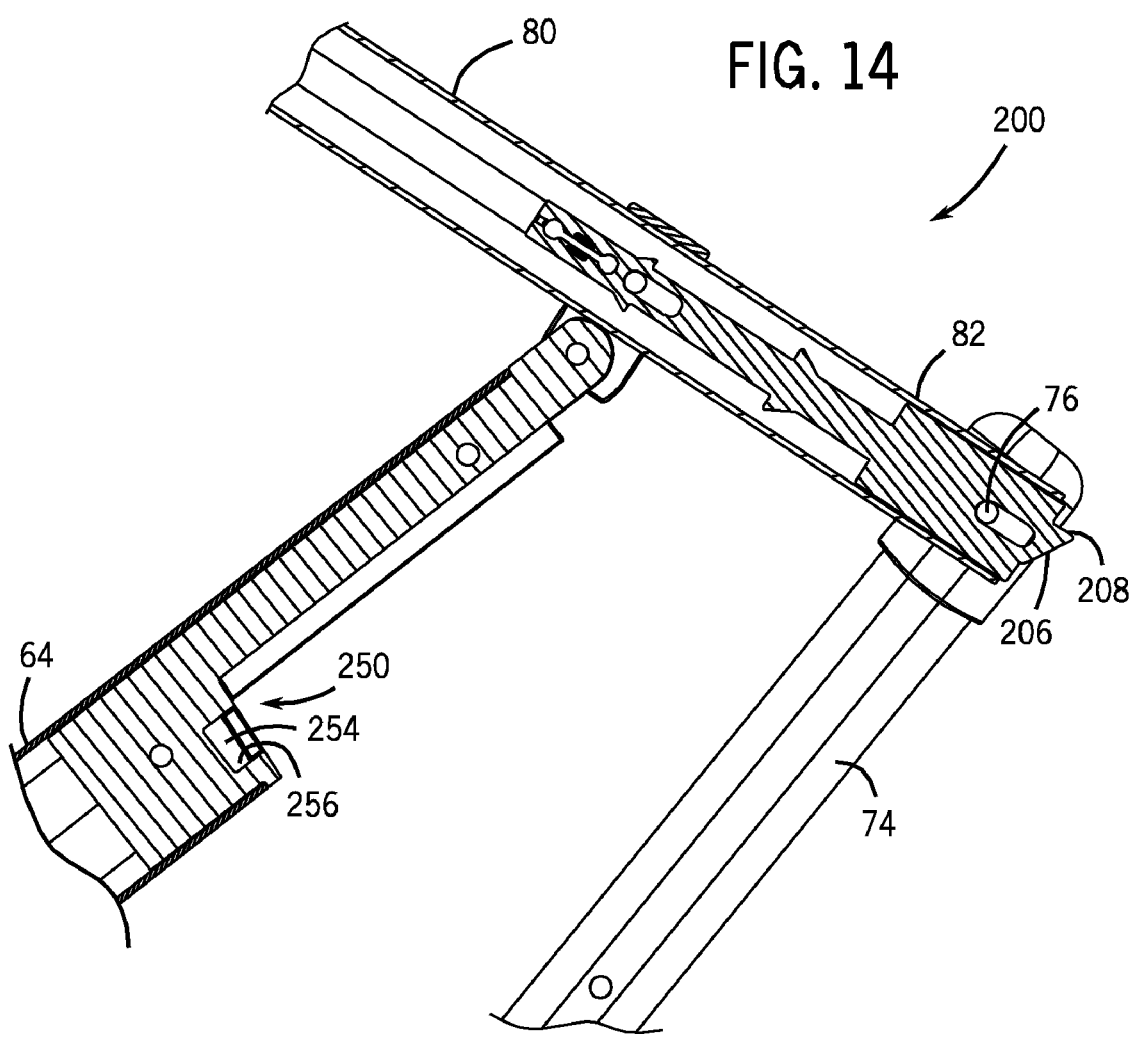
FIG. 14 shows an enlarged view of the frame latch taken from Circle F of the partially collapsed stroller frame in FIG. 12.
Figure 15:
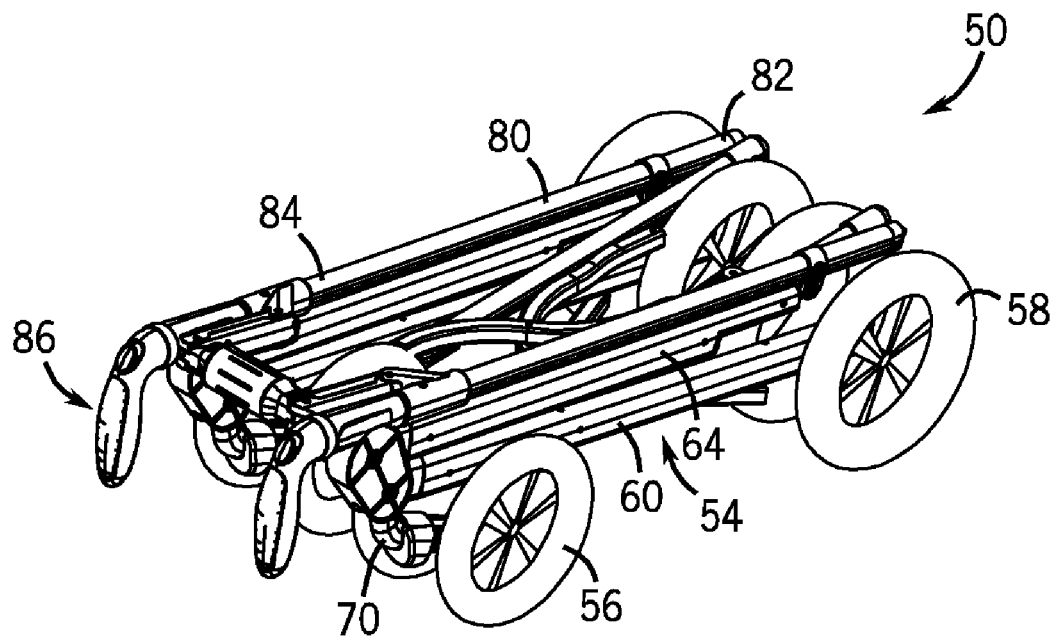
FIG. 15 shows a perspective view of the stroller frame in FIG. 1 in a completely collapsed or folded configuration.
Figure 16:
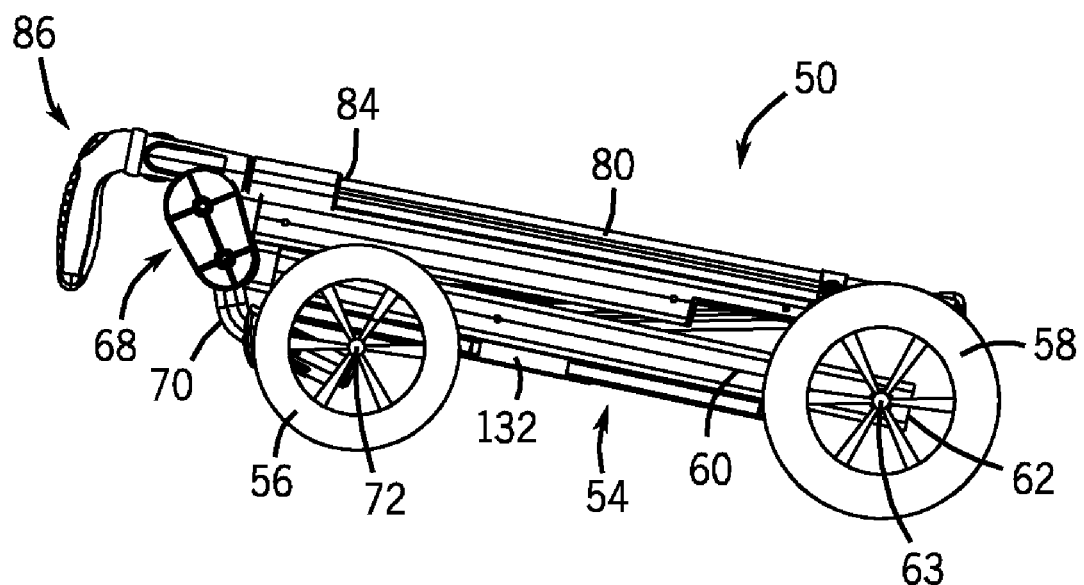
FIG. 16 shows a side view of the completely folded stroller frame in FIG. 15.
Figure 17:
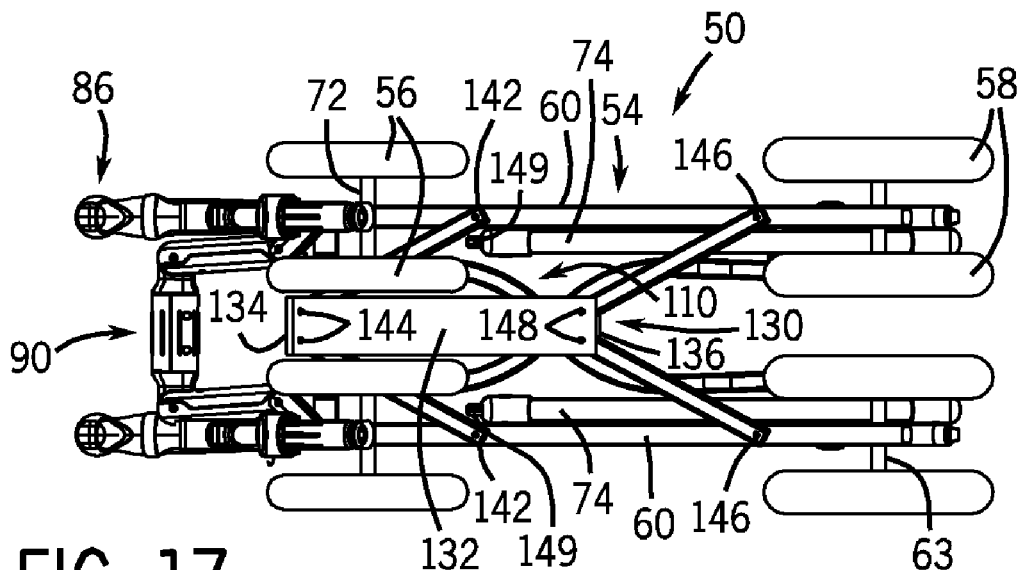
FIG. 17 shows a bottom view of the completely folded stroller frame in FIG. 15.
Figure 18:
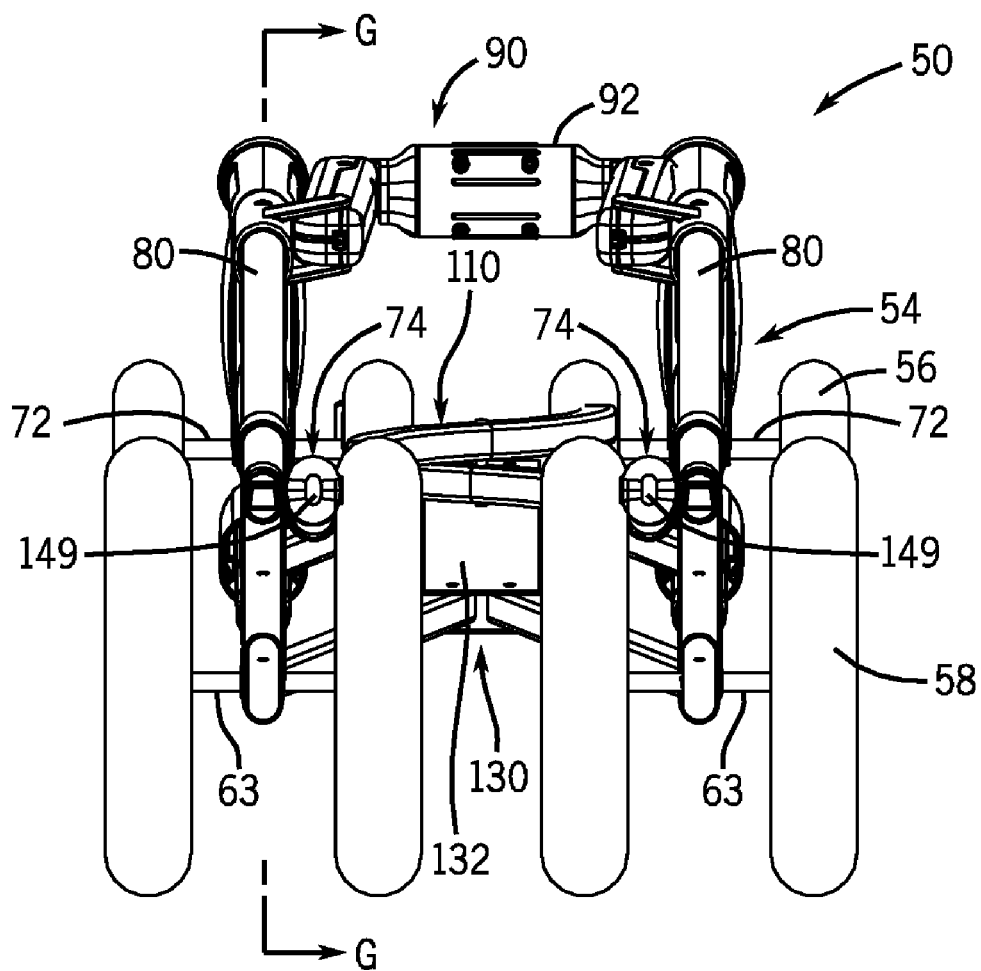
FIG. 18 shows a rear view of the completely folded stroller frame in FIG. 15.
Figure 19:
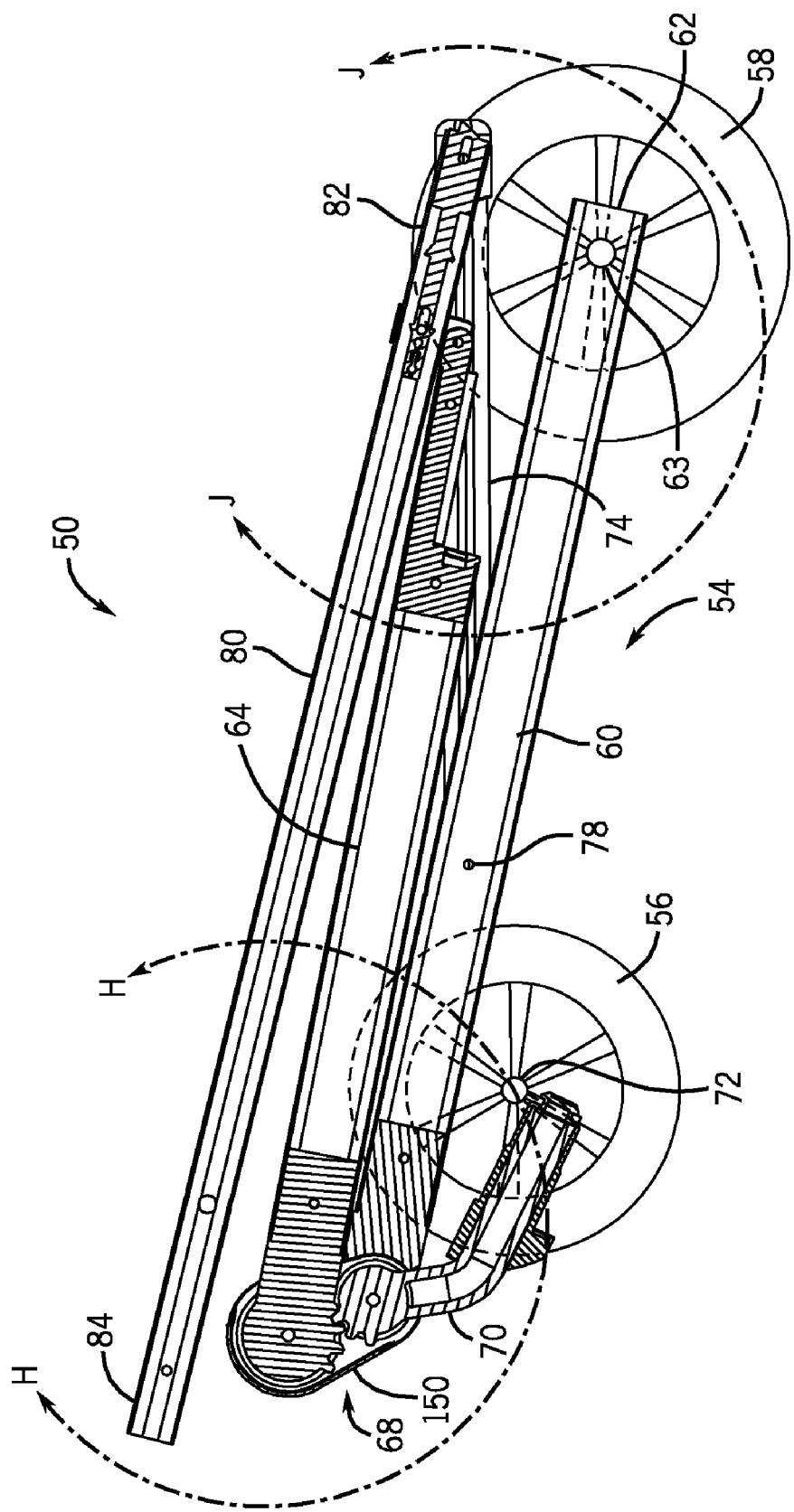
FIG. 19 shows a longitudinal cross-section taken along line G-G of the completely folded stroller frame in FIG. 18.
Figure 20:
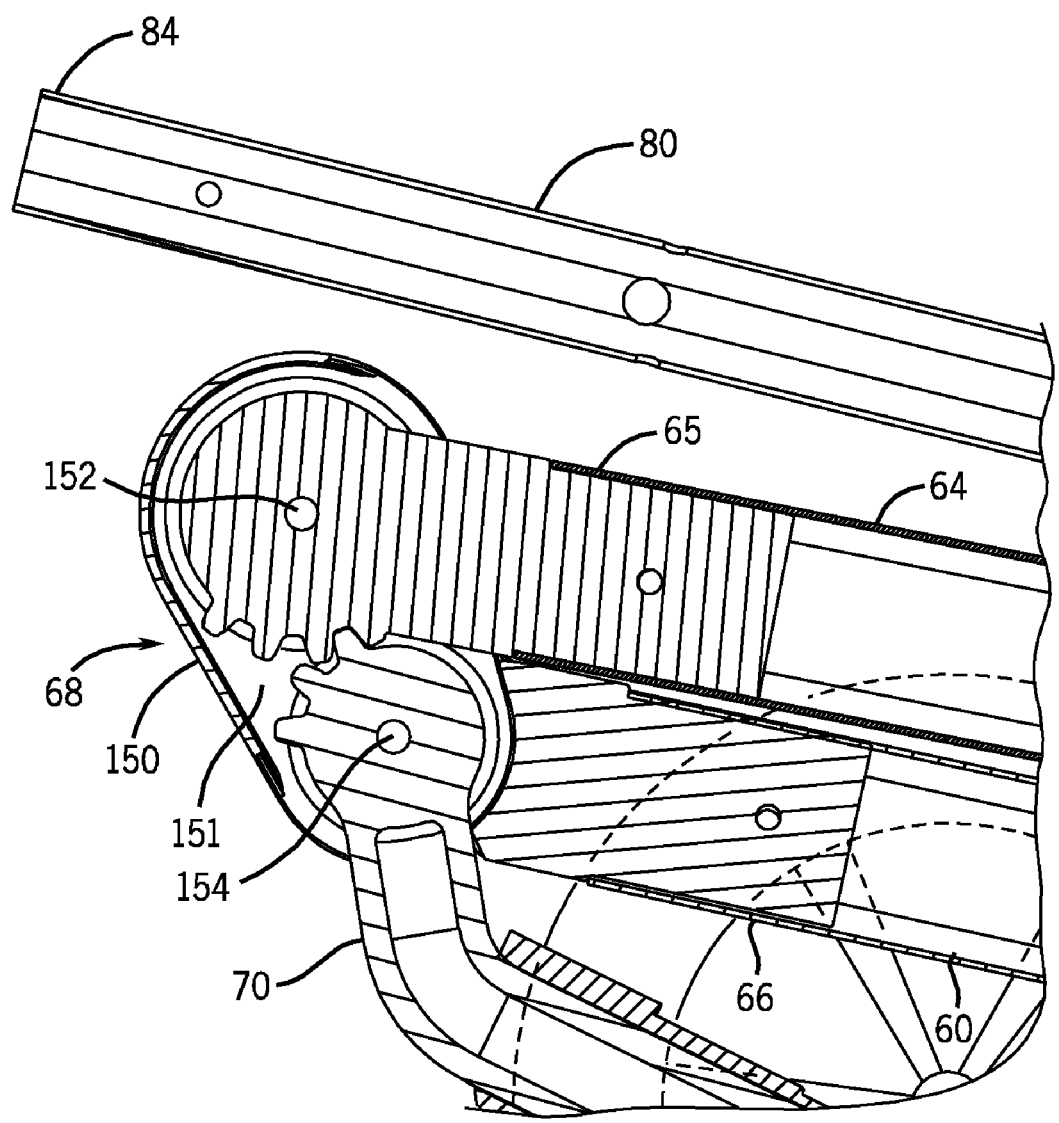
FIG. 20 shows an enlarged view of the front wheel joint taken from Circle H of the completely folded stroller frame in FIG. 19.
Figure 21:
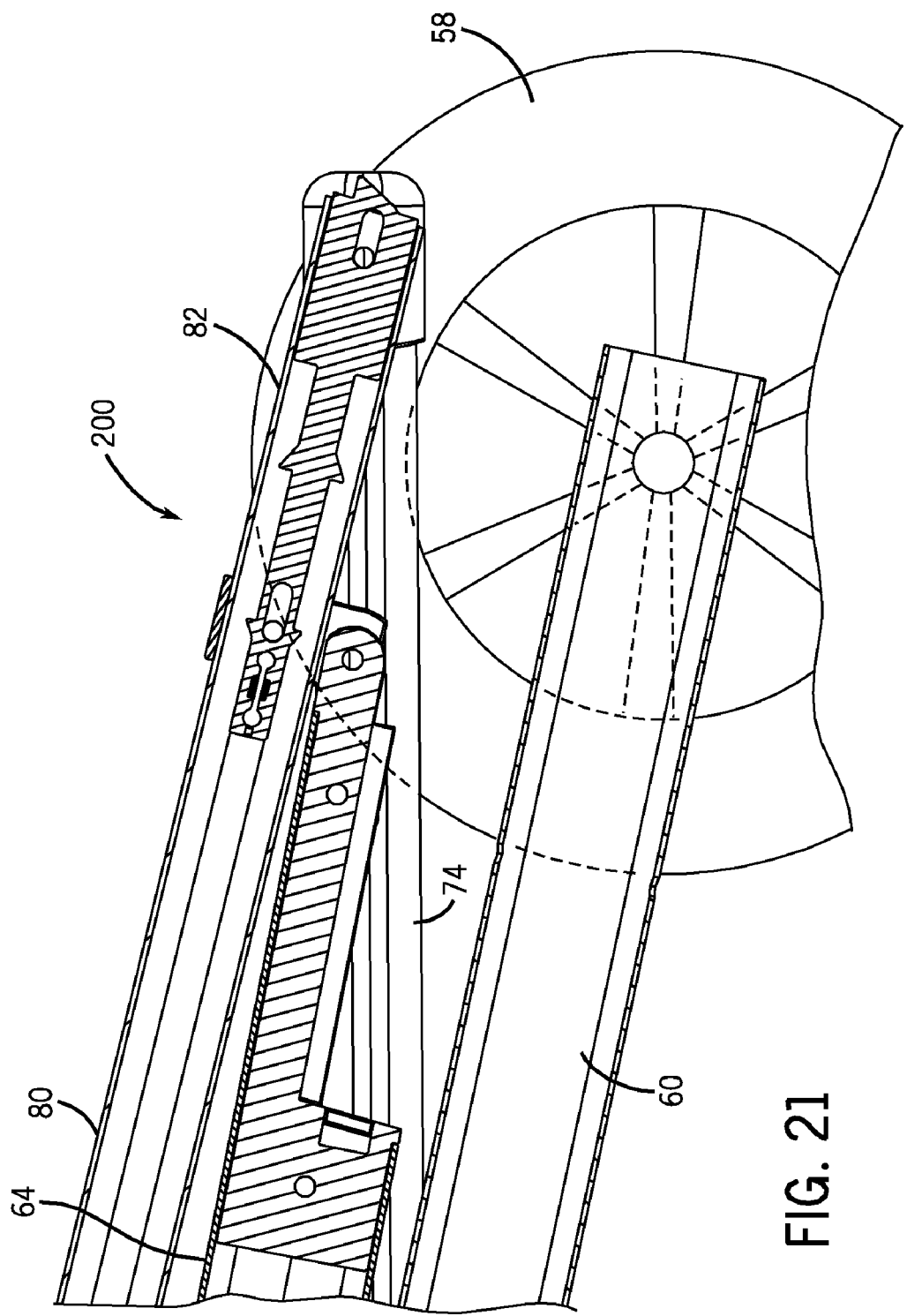
FIG. 21 shows an enlarged view of the frame latch taken from Circle J of the completely folded stroller frame in FIG. 19.
Figure 24:
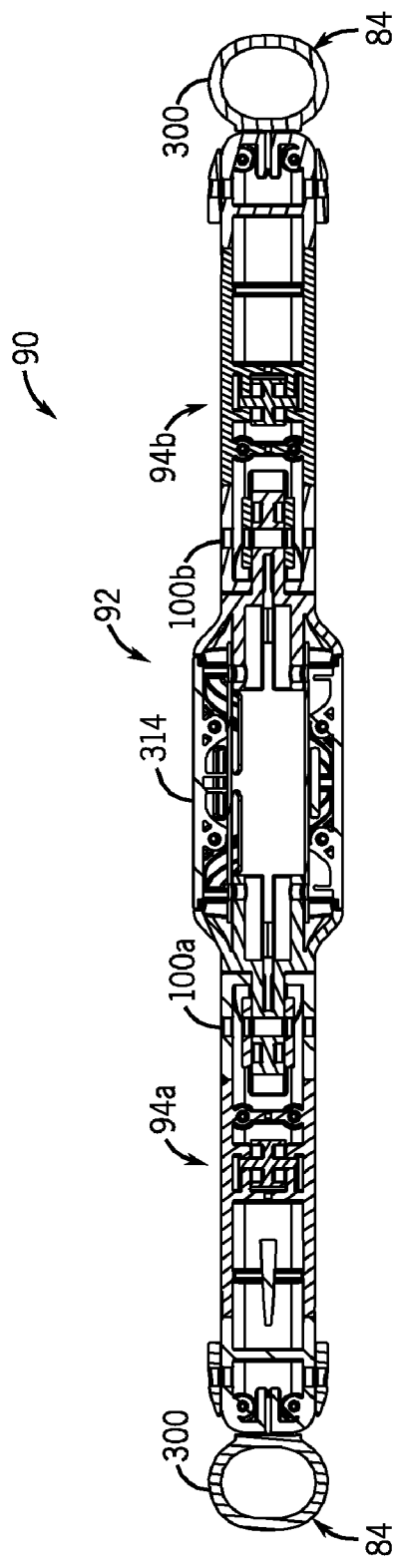
FIG. 24 shows a cross-section taken along line K-K of the cross-bar in FIG. 23.
Figure 25:
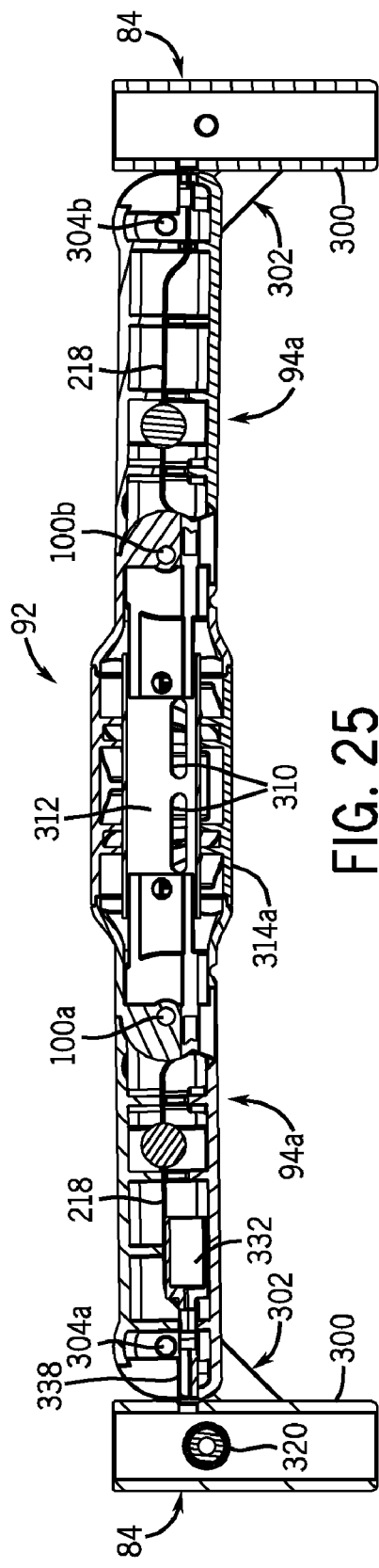
FIG. 25 shows a cross-section taken along line L-L of the cross-bar in FIG. 22.
Figure 26:
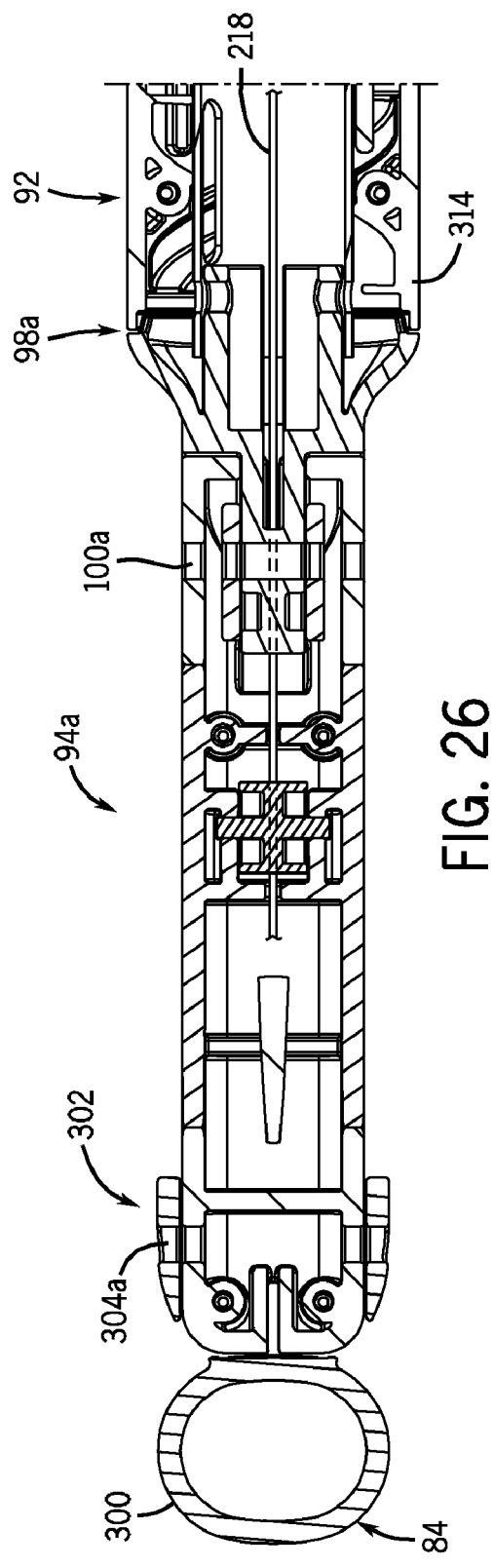
FIG. 26 shows an enlarged view of the left side of the cross-bar in FIG. 24.
Figure 27:
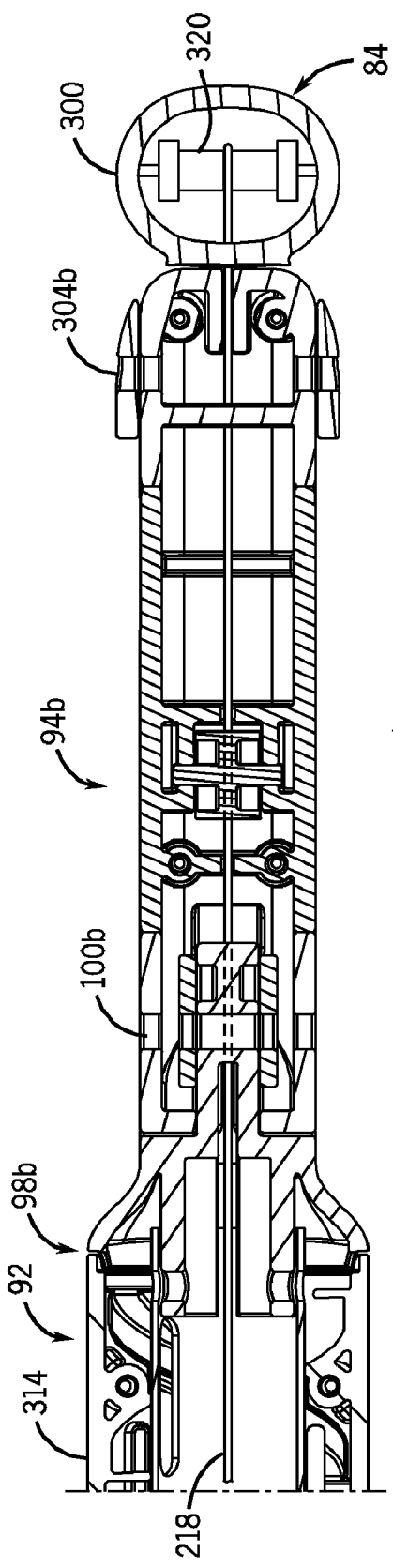
FIG. 27 shows an enlarged view of the right side of the cross bar in FIG. 24.

As shown in FIG. 13, the downward rotation of the front legs 64 about the drive gear center pivots 152 also rotates the drive gear 160 and its teeth 166 toward the front of the stroller frame 54. Movement of the drive gear teeth 166, which are meshed with the follower gear teeth 178, rotates the follower gear 170 in the opposite direction. The wheel struts 70 are thus pivoted rearward and upward toward the bottom rails 60. The motion drives collapsing movement of the front wheels 56 rearward, which shortens the stroller frame 54, and inward or upward toward the bottom rails 60, which helps to flatten the stroller frame when folded.

FIGS. 15-21 mirror the previous figure arrangement and show the stroller frame 54 in a completely folded configuration. As shown, the bottom rails 60 and front legs 64 lie close to parallel with one another, which provides a highly flat, compact folded stroller frame. The support struts 74 lie at a slight angle relative to the front legs and bottom rails, but are substantially within the cube shape defined by the legs 64 and rails 60. The linkage assembly 130 remains generally coplanar between the bottom rails 60 and, thus, also within the cube shape of the legs and rails. Similarly, the cross-member 110 lies substantially within the cube shape of the folded structure. The cross-member 110 lies at an angle relative to the other components, as it is coupled to the bottom rails and the struts. The fold geometry is controlled by lengths of the four-bar link arrangement and the location of their respective pivot connections.

The cross-bar 90 is now described in greater detail with respect to FIGS. 22-33. As noted above, the cross-bar 90 extends between and interconnects the upper ends 84 of the push arms 80. Also as noted above, the cross-bar 90 can be constructed so that it may be capable of retaining a substantially rigid or stiff, linear condition in the in-use configuration shown in FIGS. 1-4 to act as a brace or structural element of the frame assembly 54. Alternatively, the cross-bar may be held in the linear configuration in the in-use position merely by the frame geometry, if desired. In either case, the cross-bar 90 is also constructed to be capable of folding, collapsing, or being reconfigured from the linear condition in order to permit the frame assembly to fold in a width-wise direction between the frame sides.

In the disclosed example, the pivot couplings each include a tubular section 300 that mates with the upper end 84 of the push arm 80. A trunnion connection 302 extends from each of the tubular sections 300 inward toward the opposite push arm.

Figure 30:
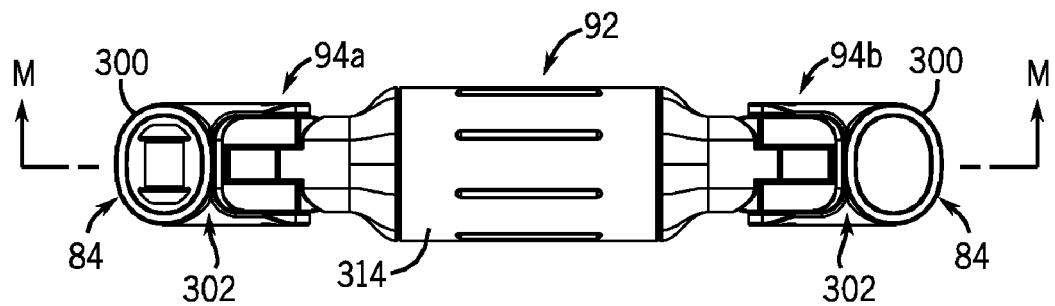
FIG. 30 shows the cross-bar of FIG. 22 in a completely collapsed or folded configuration.
Figure 31:
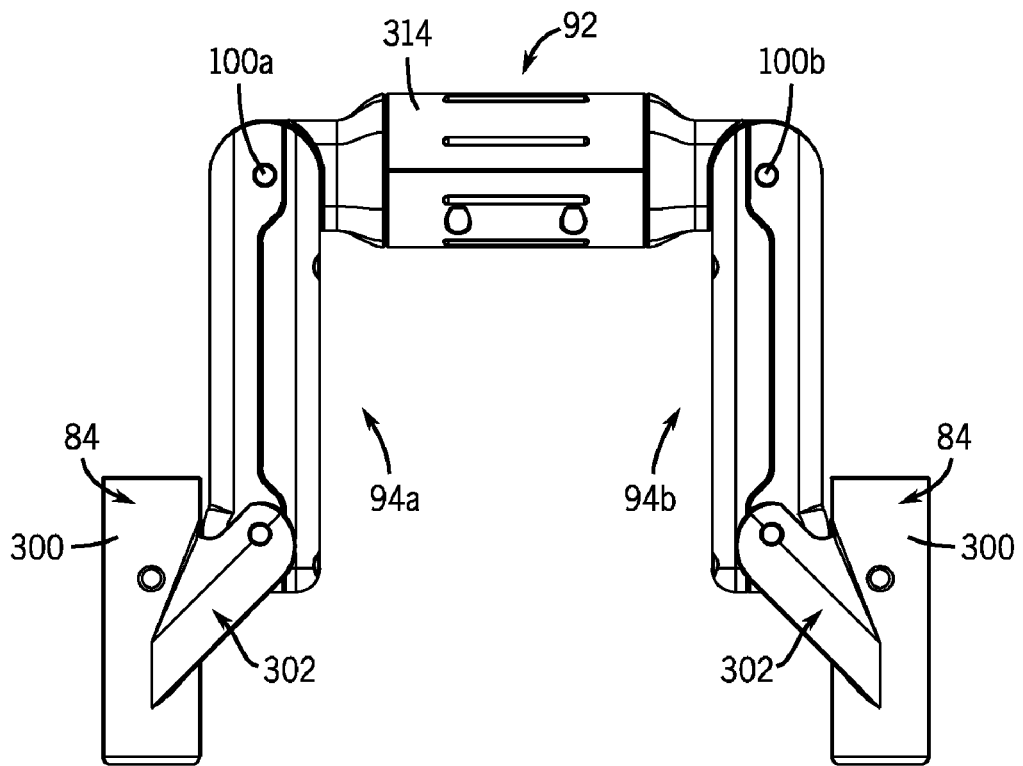
FIG. 31 shows the cross-bar of the FIG. 23 in a completely collapsed of folded configuration.
Figure 32:
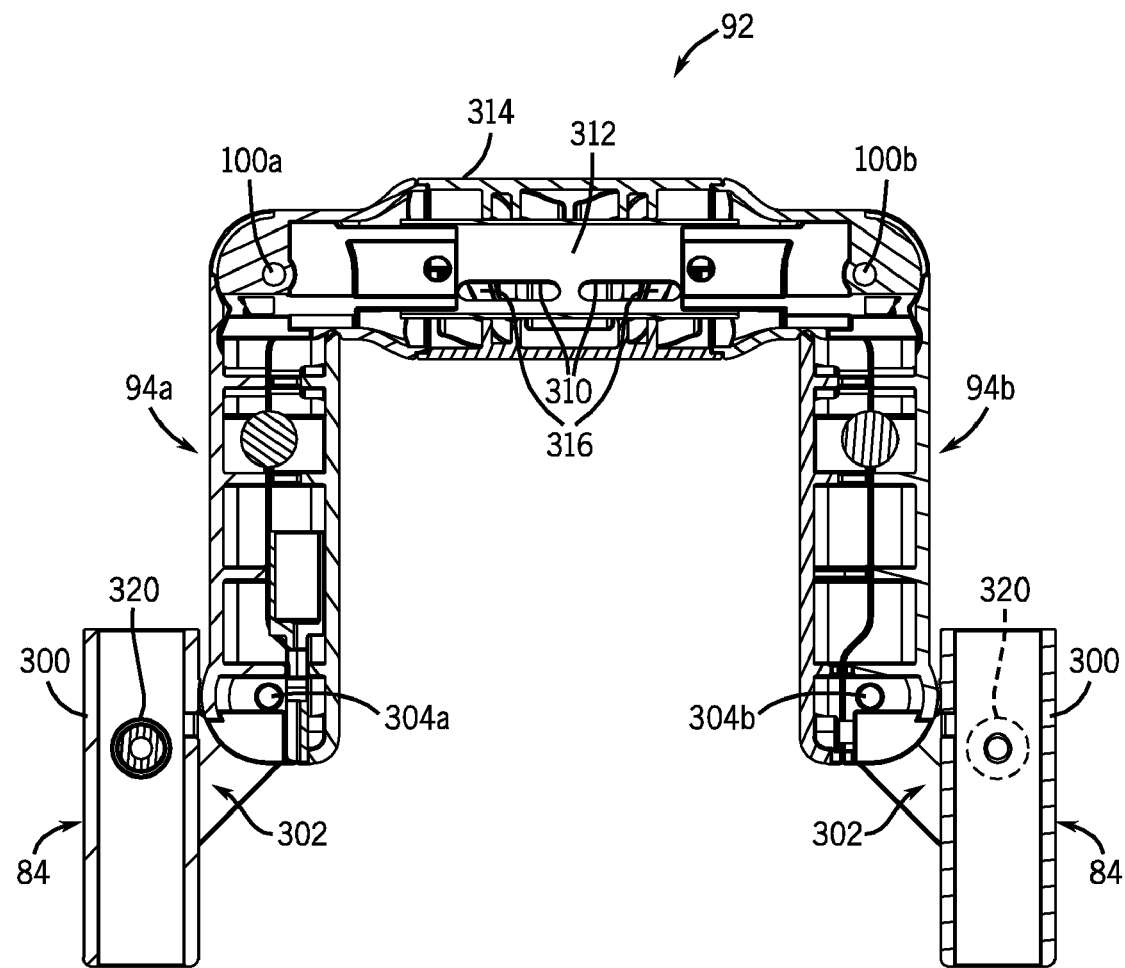
FIG. 32 shows a cross-section taken along line M-M of the cross-bar in FIG. 30.
Figure 33:
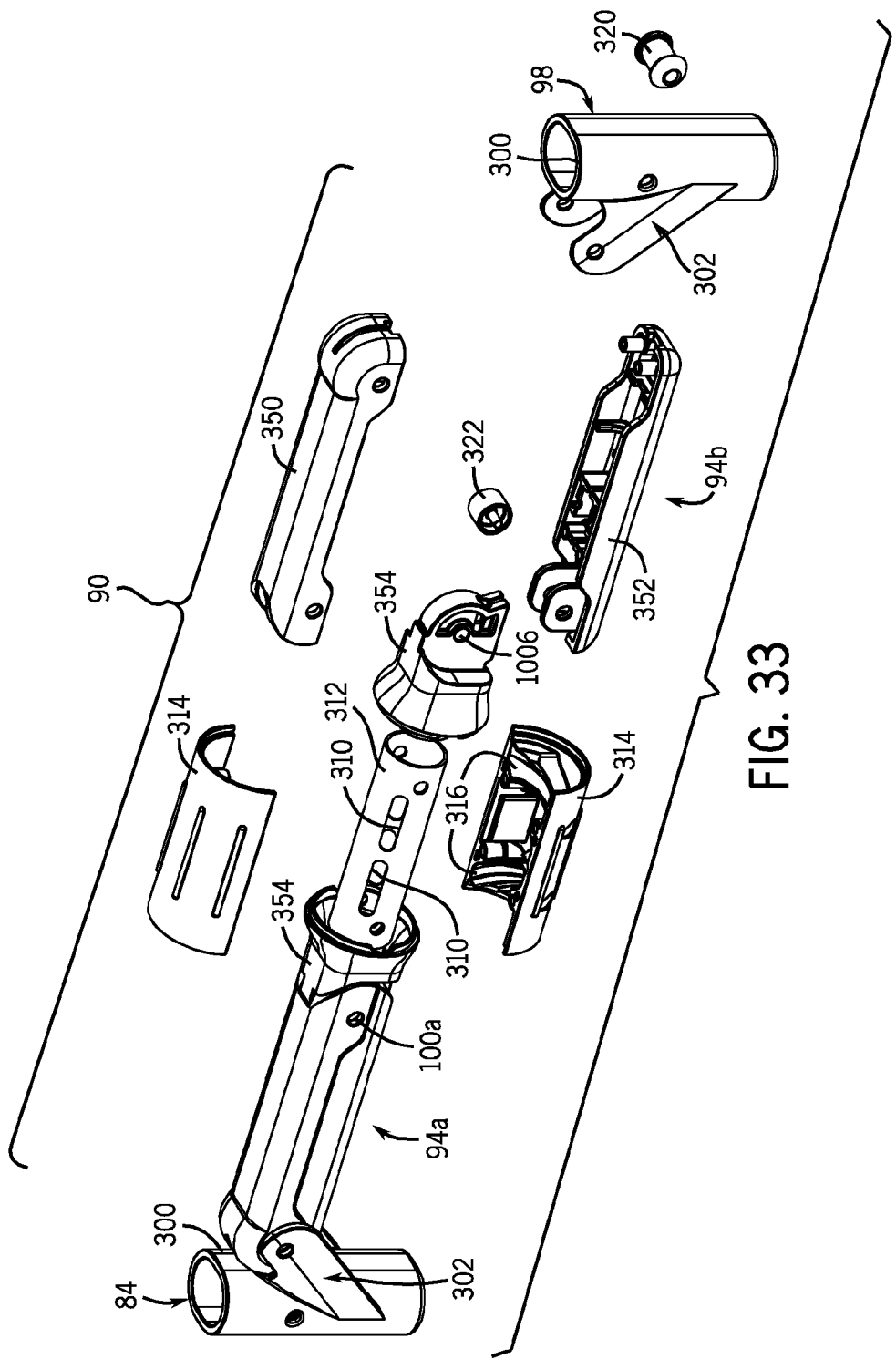
FIG. 33 shows a partially exploded view of the cross-bar shown in FIG. 22.
Figure 34:
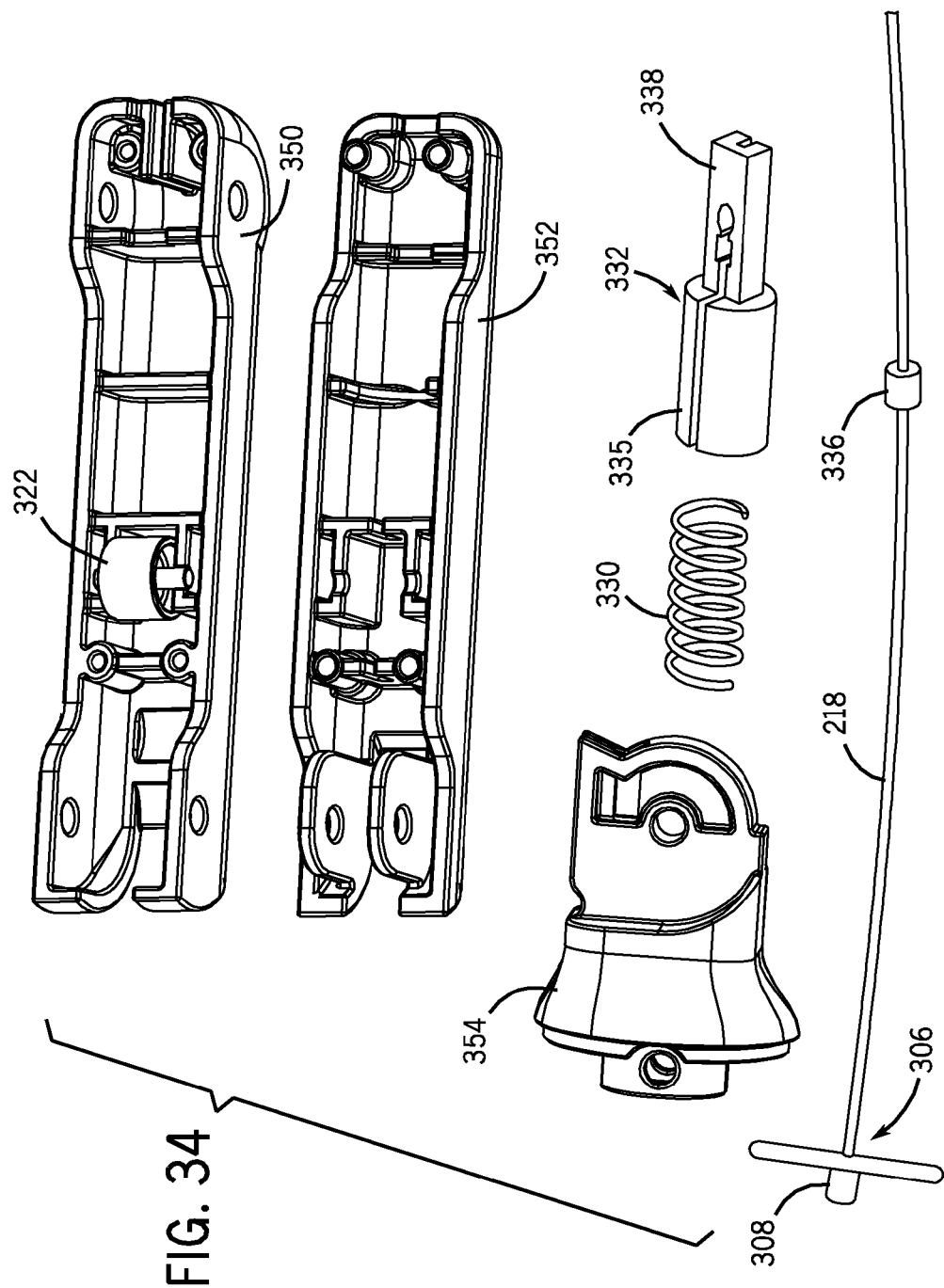
FIG. 34 shows a partially exploded view of the internal components of one side of the cross-bar in FIGS. 22 and 33.
Figure 35:
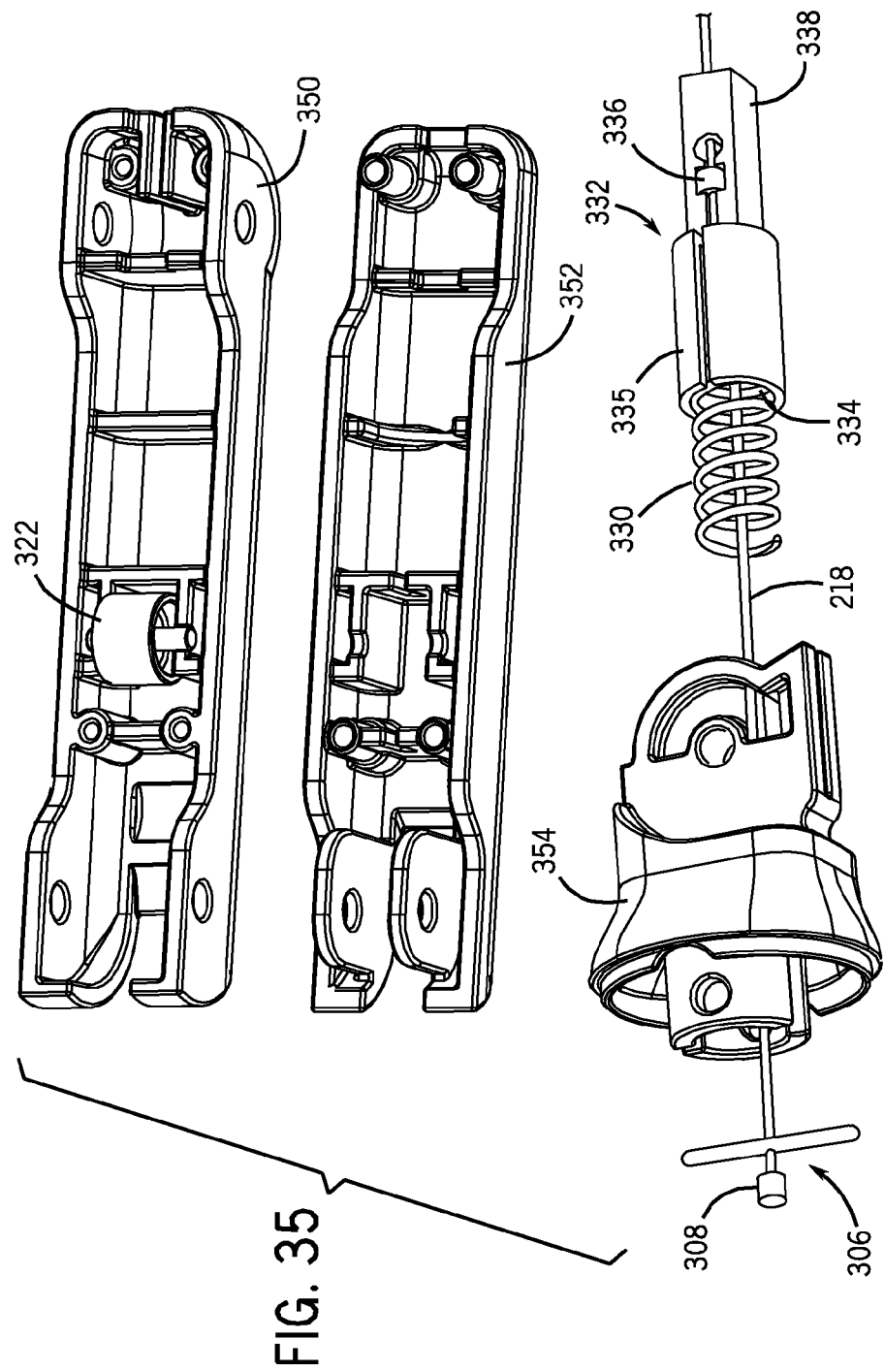
FIG. 35 shows a partly assembled view of the cross-bar components in FIG. 34.
Figure 36:
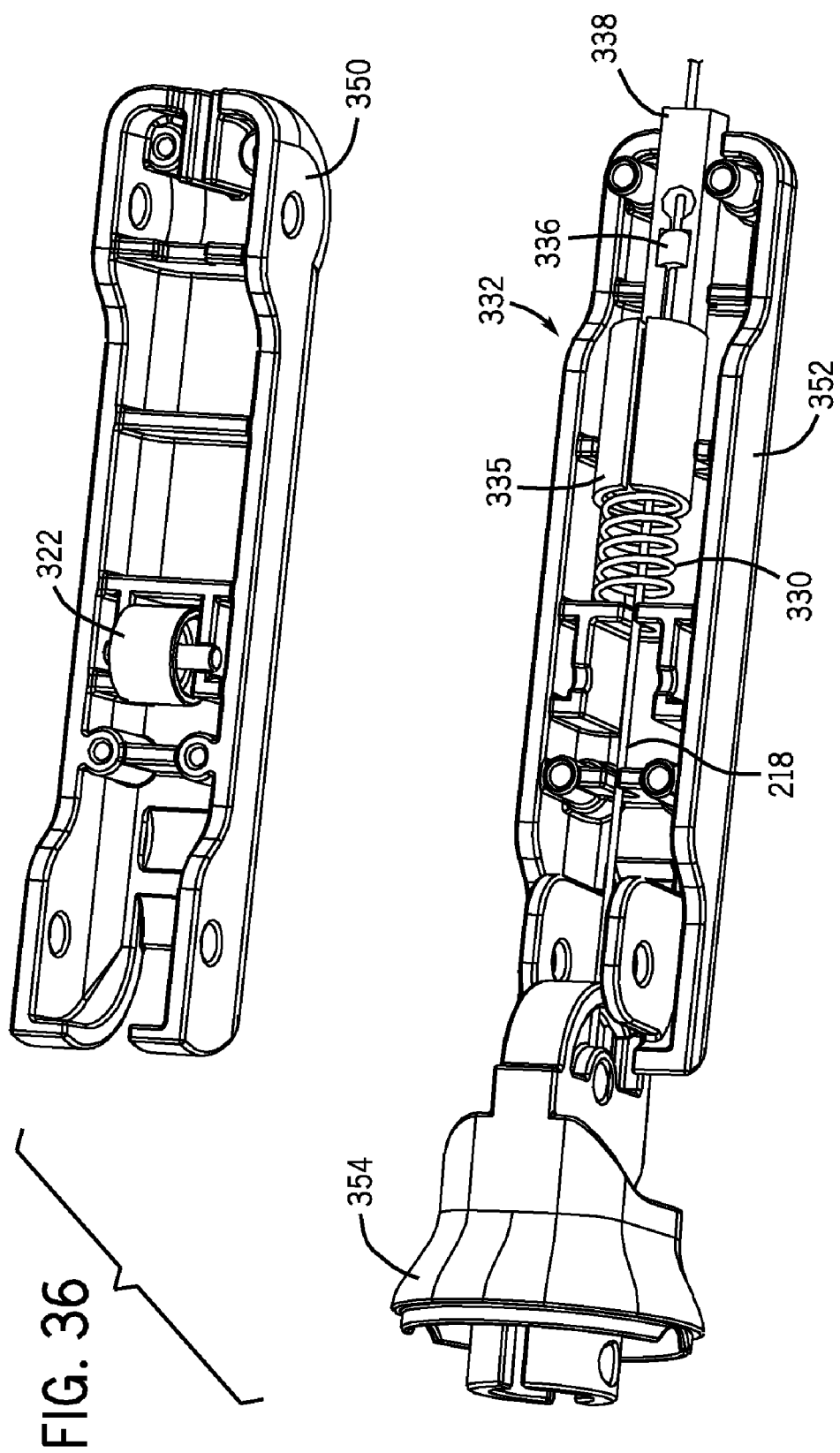
FIG. 36 shows a further assembled view of the cross-bar components in FIG. 35.

The trunnion connection 302 on each side is pivotally connected at pivots 304a and 304b to the outer ends 96a and 96b of the respective body sections. As shown in FIGS. 30-32 and in the previous frame folding figures, the cross-bar 90 can collapse or fold about the pivots 304a and 304b in the pivots 100a and 100b so that the cross-bar can longitudinally or lengthwise collapse or shorten between the push arms. The cables 218 extend up through the push arms 80, through an opening between the trunnion parts and into an opening in the end of each of the body sections 94a and 94b. The cables 218 extend through the body sections and into the actuator 92. Free ends 306 of the cables 218 are connected to slugs 308 that can be slidably or fixedly retained in laterally extending slots 310 in a cylinder 312 within the actuator 92. The slugs 308 can travel laterally along the slots 310 for insertion or removal, or optionally during use. An outer cover 314 of the actuator 92 surrounds the cylinder 312. The outer cover includes a pair of helical tracks 316 in which the cable ends and slugs can be guided and retained. Rotation of the outer cover 314 relative to the cylinder 312 of the actuator can guide the slugs 308 along the helical tracks from an outer end of each track to an inner end of each track. The slugs 308 thus travel from an outer end to an inner end of each of the slots 310. This draws the free ends of the cables 218 toward one another, which in turn pulls on each cable to release the latch assemblies 200. In an alternate example, the slugs 308 can be fixed to a rotatable part of the actuator 92. Rotation of the actuator would then rotationally relocate the slugs, which in turn would wind the cables 218 around the actuator within the cable guides and pull on the cables.

The actuator 92 can include a releasable locking mechanism to retain the actuator 92, and thus the cross-bar 90 in the in-use linear configuration. Rotation of the actuator 92 can automatically release the locking mechanism, which in turn can render the actuator 92 and the body sections 94a and 94b loose or lax. In one example, the actuator 92 can include one or more spring ball or other spring lock mechanisms that seat in openings on parts of the cross-bar 90 when the cross-bar is returned to the in-use linear configuration. The resiliency and/or the locked position of the spring mechanisms can be overcome upon rotation of the outer cover of the actuator and initial movement of the cross-bar 90 to begin folding or collapsing of the stroller frame. Other locking mechanisms can also be used in conjunction with the cross-bar 90. Alternatively, the cross-bar can be constructed with no releasable locking mechanism. Instead, the cross-bar 90 can rely on the structural integrity of the joints between the three components when in the in-use configuration, in combination with the sturdiness of the stroller frame.

To help prevent binding of the cables 218 within the cross-bar, a number of structural details can be employed to help guide the cables 218 and retain the position of the cables as they are pulled from the latch locked position to the latch release position. In one example, a plurality of guides can be provided and aligned lengthwise along the cross-bar components. Additionally, one or more rotatable wheels or rollers can be employed with cable guide grooves or the like in the outer circumferential surfaces of these components. In one example, cable guide rollers 320 can be provided on a pivot within the couplers 98 to assist in positioning the cable centrally within the push arms 80. In another example, rollers 322 can be pivotally mounted within the body sections 94a and 94b of the cross-bar 90 to assist in repositioning or realigning the cable over the length of the cross-bar, both when stiff and when loose and/or folded or collapsed.

As best illustrated in FIGS. 33-37, a cable return spring 330 can be positioned along the cross-bar 90 to assist in automatically returning the cables to the latch locked position. In one example, a spring guide 332 can be slidably received in a chamber 334 in each of the body sections 94a and 94b. Each spring 330 can be captured within a cylinder 335 of the respective spring guide. One end of the spring can bear against a surface of the body section in the chamber and the opposite end facing the push arms 80 can bear against a surface of the spring guide in the cylinder 335. A crimp 336 can be provided on each cable and captured within a space 337 in their respective spring guide 332. Thus, as the slugs 308 are pulled by the actuator 92, the crimps 336 will pull on the cables against the force of the springs 330. When the actuator 92 is released, the springs 330 will draw the crimps 336 in opposite directions toward the push arms, which will in turn draw the slugs 308 at the ends of the cables away from one another. This will in turn rotate the actuator 92 back to the rest position or latch lock position.

An extended end 338 of each spring guide 332 can project out from the ends 96a and 96b of the respective body sections 94 and 94b. These ends 338 can act as locking pins to retain or assist in retaining the cross-bar 90 in the linear in-use position as well. Rotation of the outer cover 314 of the actuator 92 will pull on the spring guides 332, which in turn will release the ends 338 to allow the cross-bar 90 to collapse. Releasing the outer cover 314 will result in the cables and springs returning the ends 338 to outward biased positions. When the frame is unfolded, the ends 338 can fit into latch openings 340 in the push arms to assist in retaining the stiff cross-bar condition during use.

Each of the pivot joints of the cross-bar 90 can also include curved cable guides or slots that assist in retaining the cable position while allowing the cable to slide along the guides or slots. This will avoid kinking the cable during folding or unfolding of the cross-bar. The joints can thus be configured to further assist in preventing binding of the cables. As will be evident to those having ordinary skill in the art, the configuration and construction of the actuator 92 and the cross-bar 90 can vary within the spirit and scope of the present invention. The example disclosed herein permits one hand actuation of both of the latch assemblies 200 and folding of the stroller frame 52.

Each of the pivot joints between the actuator 92 and the body sections 94a and 94b can also be configured to incorporate all or part of a releasable locking mechanism to assist in holding the cross-bar 90 in the in-use configuration. The means employed to releasably lock these joints with the cross-bar 90 in the linear configuration can vary. Various detents and/or spring biased retainer components on the mating pivot joint parts can be employed to releasably retain the cross-bar 90 in the stiff or linear condition.

As depicted in FIGS. 33 and 34-37, the actuator 90, including the outer cover 314 can be formed of multiple parts assembled together. Similarly, the body sections 94a, 94b can also be formed of multiple assembled components. In this example, the body sections 94a and 94b each are formed of two mating shells 350 and 352. One end of the shells 350, 352 on each body section 94a, 94b pivotally connects to the trunnion brackets 302 via the pivots 304a and 304b. An opposite end of the assembled shells 350, 352 pivotally connect at the pivots 100a, 100b respective bell housings 354a, 354b, one on each side of the actuator 98a, 98b. The bell housings are configured to allow routing of the cables 218 therethrough while connecting the actuator 90 to the body sections 94a, 94b. The shells 350, 352 can be configured to house various components as well, when assembled, such as the cable guides 332, springs 330, and rollers 322, for example. The configuration and construction of the cross-bar can vary from the examples shown and described herein. The cross-bar may be capable of maintaining a stiff or rigid condition in the in-use configuration and should be capable of going loose or lax so as to be capable of folding when the stroller is reconfigured to the folded configuration.

The stroller frame 52 and its various components can be formed from virtually any suitable material and yet fall within the spirit and scope of the present invention. Aluminum, steel, plastic, reinforced plastic, carbon fiber, or other materials can be used for the frame assembly major components. Nylon, acetyl, plastic, and other suitable materials can be utilized for the connections between the frame components, the cross-bar components, and the like. The present invention is not intended to be limited to specific materials or manufacturing processes.

Although certain stroller frame and frame fold components and characteristics have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A foldable stroller frame comprising:
    a frame structure with two laterally spaced apart frame sides, the frame structure being three dimensionally foldable from an in-use configuration to a folded configuration;
    a fold joint assembly provided on a part of the frame structure and configured to maintain the frame structure in the in-use configuration; and
    an actuator coupled to the frame structure, the actuator being capable of actuation with one hand of a user to release the fold joint assembly,
    wherein the frame structure can then move from the in-use configuration to the folded configuration using only the one hand, and wherein the frame sides are laterally closer to one another in the folded configuration than in the in-use configuration,
    wherein the fold joint assembly is disengaged from a part of the frame structure when the frame structure is in the folded configuration,
    wherein each frame side includes
        a bottom rail having a forward end and a rear end,
        a front leg having a lower end pivotally connected at a front leg pivot to the forward end of the bottom rail,
        a push arm having a lower end pivotally connected at a handle pivot to an upper end of the front leg, and
        a support strut pivotally connected at one end to the bottom rail at a strut pivot and pivotally connected at the opposite end to the lower end of the push arm at an upper strut pivot spaced from the handle pivot, and
    wherein the fold joint assembly releasably connects the lower end of the push arm to the upper end of the front leg.

2. A foldable stroller frame according to claim 1, wherein the frame structure further includes a stroller handle with the actuator coupled to part of the stroller handle.

3. A foldable stroller frame according to claim 1, further comprising:
    a pair of the fold joint assemblies, one on each of the frame sides;
    a pair of push arms extending upward and rearward, one from each of the fold joint assemblies;
    a cross-bar extending between the push arms, the actuator being carried on the cross-bar, whereby the push arms and the cross-bar can be pivoted forward using the one hand to reconfigure the frame structure to the folded configuration.

4. A foldable stroller frame according to claim 3, wherein the cross-bar is reconfigurable from a substantially stiff condition in the in-use configuration to a loose, reconfigurable condition upon movement of the actuator to release the fold joint assemblies.

5. A foldable stroller frame according to claim 1, wherein each frame side further comprises:
    a linkage assembly extending between the frame sides and capable of movement between an on center or over center arrangement and a past center arrangement, the linkage assembly retained in the on center or over center arrangement in the in-use configuration; and
    a finger carried on a part of the frame structure adjacent part of the linkage assembly, whereby the finger drives the linkage assembly from the on center or over center arrangement to the past center arrangement as the frame structure is folded to permit folding of the linkage assembly.

6. A foldable stroller frame according to claim 1, wherein the frame structure further comprises:
    a linkage assembly extending between the bottom rails and capable of movement between an on center or over center arrangement and a foldable past center arrangement, the linkage assembly retained in the on center or over center arrangement in the in-use configuration; and
    a finger carried on the one end of each support strut adjacent the linkage assembly, whereby the finger drives the linkage assembly from the on center or over center arrangement to the foldable past center arrangement as the frame structure is folded.

7. A foldable stroller frame according to claim 1, further comprising a front wheel assembly mounted to the each frame side, wherein each front wheel assembly is gear driven and pivotable from an in-use position to a folded position.

8. A foldable stroller frame according to claim 1, further comprising a scissor cross-member extending between and connected to the frame sides, the cross-member having a pair of arms coupled to one another at a center pivot.

9. A stroller comprising:
    a frame assembly with a stroller handle and spaced apart left and right sides defining a stroller width, the frame assembly being foldable in at least height and width directions from an in-use configuration to a folded configuration;
    a fold latch on each of the left and right frame sides coupled to the stroller handle, each fold latch movable from a latched arrangement retaining the frame assembly in the in-use configuration to a released arrangement releasing the frame assembly and stroller handle for movement to the folded configuration; and
    a fold actuator coupled to the stroller handle and being actuable with only one hand to release each fold latch, the stroller handle then being movable with only the one hand to reconfigure the frame assembly from the in-use configuration to the folded configuration thereby reducing the width between the left and right sides,
    wherein each fold latch is disengaged from apart of the frame assembly when the frame assembly is in the configuration, and
    wherein each of the left and right sides of the assembly includes
        a front leg having an upper end and a lower end, and a push arm having a lower end and an upper end, the push arm near its lower end pivotally coupled near the upper end of the front leg.

10. A stroller according to claim 9, further comprising:
a pair of push arms extending upward and rearward, one from each fold latch;
a cross-bar extending between the push arms, the actuator being carried on the cross-bar, whereby the push arms and the cross-bar can be pivoted forward using the one hand to reconfigure the frame structure to the folded configuration.

11. A stroller according to claim 10, wherein the cross-bar is reconfigurable from a substantially stiff condition in the in-use configuration to a loose, reconfigurable condition upon movement of the actuator to release the fold latch.

12. A stroller according to claim 11, further comprising a cable routed from each fold latch through the push arms and the cross-bar to the actuator, whereby actuation of the fold actuator pulls on the cables to release each fold latch.

13. A stroller according to claim 12, wherein the cross-bar has three sections pivotally connected to one another, the fold actuator being one of the sections and rotatable about a lengthwise axis of the cross-bar.

14. A stroller according to claim 10, wherein the cross-bar has at least two sections pivotally connected to one another, the fold actuator being carried on the cross bar.

15. A stroller according to claim 9, wherein each fold latch includes a spring biased slider housed with the lower end of the respective push arm, a latch projection on an exposed end of the slider, and a latch receptacle on the upper end of the front leg.

16. A stroller according to claim 15, further comprising a cable interconnecting the fold actuator with each of the fold latches, the cable passing through each of the push arms.

17. A stroller frame structure having left and right sides, the frame structure being three-dimensionally foldable in length, height, and side-to-side width directions from an in-use configuration to a folded configuration, the frame structure comprising:
a fold joint assembly on each of the left and right sides of the frame structure, each fold joint assembly in a latched condition configured to retain the frame structure in the in-use configuration;
a front leg on each of the left and right sides of the frame structure, each front leg having a lower end and an upper end;
a push arm on each of the left and right sides of the frame structure, each push arm having an upper end and having a lower end pivotally coupled at the respective fold joint assembly to the respective front leg near the upper end of the front leg;
a reconfigurable cross-bar extending between the push arms near the respective upper ends; and
an actuator on the cross-bar and actuable with only one hand to release the fold joint assemblies, whereby the push arms are then pivotable forward with only the one hand to reconfigure the frame structure in the length, height, and width directions to the folded configuration.

18. A stroller frame structure according to claim 17, further comprising:
a bottom rail extending rearward from the lower end of each of the front legs;
a support strut pivotally connected at one end to each of the bottom rails and pivotally connected at the opposite end to the lower end of each of the push arms,
a linkage assembly extending between the bottom rails and capable of movement between an on center or over center arrangement and a foldable past center arrangement, the linkage assembly retained in the on center or over center arrangement in the in-use configuration; and
a finger carried on the one end of each support strut adjacent the linkage assembly, whereby the finger drives the linkage assembly from the on center or over center arrangement to the foldable past center arrangement as the frame structure is folded.

19. A foldable stroller frame comprising:
a frame assembly with two laterally spaced apart frame sides, the frame structure being three dimensionally foldable from an in-use configuration to a folded configuration, and each frame sides of the frame structure including
a bottom rail having a forward end and a rear end,
a front leg having a lower end pivotally connected at a front leg pivot to the forward end of the bottom rail,
a push arm having a lower end pivotally connected at a handle pivot to an upper end of the front leg, and
a support strut pivotally connected at one end to the bottom rail at a strut pivot and pivotally connected at the opposite end to the lower end of the push arm at an upper strut pivot spaced from the handle pivot;
a fold joint assembly, provided on a part of the frame structure that releasably connects the lower end of the push arm to the upper end of the front leg, the fold joint assembly configured to maintain the frame structure in the in-use configuration; and
an actuator coupled to the frame structure, the actuator being capable of actuation with one hand of a user to release the fold joint assembly,
wherein the frame structure can then move from the in-use configuration to the folded configuration using only the one hand, and wherein the frame sides are laterally closer to one another in the folded configuration than in the in-use configuration.

20. A stroller comprising:
a frame assembly with a stroller handle and spaced apart left and right sides defining a stroller width, the frame assembly being foldable in at least height and width directions from an in-use configuration to a folded configuration, each of the left and right sides of the frame assembly including
a fold latch coupled to the stroller handle, the fold latch movable from a latched arrangement retaining the frame assembly in the in-use configuration to a released arrangement releasing the frame assembly and stroller handle for movement to the folded configuration; and
a front leg having an upper end and a lower end, and
a push arm having a lower end and an upper end, the push arm near its lower end pivotally coupled near the upper end of the front leg; and
a fold actuator coupled to the stroller handle and being actuable with only one hand to release each fold latch, the stroller handle then being movable with only the one hand to reconfigure the frame assembly from the in-use configuration to the folded configuration thereby reducing the width between the left and right sides.

* * * * *

UNITED STATES PATENT AND TRADEMARK OFFICE
CERTIFICATE OF CORRECTION

| | | |
|---|---|---|
| PATENT NO. | : 8,186,706 B2 | Page 1 of 1 |
| APPLICATION NO. | : 12/352384 | |
| DATED | : May 29, 2012 | |
| INVENTOR(S) | : Michael A. Dotsey | |

It is certified that error appears in the above-identified patent and that said Letters Patent is hereby corrected as shown below:

Title Page 2, Item (56)
References Cited, Other Publications:
Second Reference
"Greco Cleo" should be --Graco Cleo--

Title Page 2, Item (56)
Sixth Reference
"The Greco Cleo Stroller" should be --The Graco Cleo Stroller--

In the claims:
Column 16
claim 9, line 62, delete "apart" and replace with --a part--

Column 16
claim 9, line 63, insert --folded-- before "con-figuration"

Column 18
claim 19, line 12, delete "assembly" and replace with --structure--

Column 18
claim 19, line 15, delete "sides" and replace with --side--

Signed and Sealed this
Eleventh Day of September, 2012

David J. Kappos
*Director of the United States Patent and Trademark Office*